United States Patent
Behkish et al.

(10) Patent No.: US 11,383,202 B2
(45) Date of Patent: *Jul. 12, 2022

(54) DISTILLATE PRODUCTION FROM OXYGENATES IN MOVING BED REACTORS

(71) Applicant: ExxonMobil Technology and Engineering Company, Annandale, NJ (US)

(72) Inventors: Arsam Behkish, Flemington, NJ (US); Anjaneya S. Kovvali, Herndon, VA (US)

(73) Assignee: ExxonMobil Technology and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/910,018

(22) Filed: Jun. 23, 2020

(65) Prior Publication Data

US 2020/0398220 A1   Dec. 24, 2020

Related U.S. Application Data

(60) Provisional application No. 62/865,615, filed on Jun. 24, 2019.

(51) Int. Cl.
  *B01J 8/26* (2006.01)
  *B01J 8/18* (2006.01)
  (Continued)

(52) U.S. Cl.
  CPC ......... *B01D 53/8631* (2013.01); *B01D 53/08* (2013.01); *B01D 53/8696* (2013.01);
  (Continued)

(58) Field of Classification Search
  CPC ............... B01D 53/8631; B01D 53/08; B01D 53/8696; B01J 8/26; B01J 29/90;
  (Continued)

(56) References Cited

U.S. PATENT DOCUMENTS

2,482,140 A    9/1949  Schutte
3,354,078 A   11/1967  Miale et al.
(Continued)

FOREIGN PATENT DOCUMENTS

CN   1223899 A   12/1998
EP   0552457 B1   1/1994
WO   9201768 A    6/1992

OTHER PUBLICATIONS

Jiang, et al; "Methanol to Propylene Process in a Moving Bed Reactor with Byproducts Recycling: Kinetic Study and Reactor Simulation", 2014, vol. 53, pp. 4623-4632.
(Continued)

*Primary Examiner* — Huy Tram Nguyen
(74) *Attorney, Agent, or Firm* — Liza Negron

(57) ABSTRACT

Systems and methods are provided for conversion of oxygenate feeds to distillate boiling range products using multiple moving bed reactor stages. The systems and methods allow for multiple stages to be used while avoiding the need for distillation or other boiling point based separation as the mixture of feed and effluent is passed between stages. Instead, a stripping gas is used to disengage the feed and effluent from the catalyst solids. In combination with an improved moving bed reactor design, this can allow substantially all of the feed and effluent from a first moving bed reactor stage to be passed into a second moving bed reactor stage, even when the feed and effluent include both vapor and liquid phase portions.

16 Claims, 7 Drawing Sheets

(51) Int. Cl.
  *B01D 53/08*   (2006.01)
  *B01J 19/26*   (2006.01)
  *B01D 53/86*   (2006.01)
  *B01J 29/90*   (2006.01)
  *B01J 19/00*   (2006.01)

(52) U.S. Cl.
  CPC ............... *B01J 8/26* (2013.01); *B01J 29/90* (2013.01); *B01J 8/1818* (2013.01); *B01J 19/0053* (2013.01); *B01J 19/26* (2013.01)

(58) Field of Classification Search
  CPC ...... B01J 8/1818; B01J 19/0053; B01J 19/26; B01J 8/085; B01J 8/087; B01J 8/12
  USPC .......................................................... 422/139
  See application file for complete search history.

(56) References Cited

U.S. PATENT DOCUMENTS

| | | |
|---|---|---|
| 4,582,815 A | 4/1986 | Bowes |
| 4,968,409 A | 11/1990 | Smith |
| 5,849,976 A | 12/1998 | Gosling et al. |
| 5,916,529 A | 6/1999 | Scheuerman |
| 6,046,373 A | 4/2000 | Sun |
| 6,121,504 A | 9/2000 | Kuechler et al. |
| 6,437,208 B1 | 8/2002 | Kuechler et al. |
| 7,371,915 B1 | 5/2008 | Kalnes et al. |
| 7,414,167 B2 | 8/2008 | Kalnes et al. |
| 7,663,012 B2 | 2/2010 | Kalnes et al. |
| 8,192,706 B2 | 6/2012 | Grochowski |
| 8,323,476 B2 | 12/2012 | Sadler et al. |
| 9,162,205 B2 | 10/2015 | Sprague |
| 10,188,998 B2 | 1/2019 | Behkish et al. |
| 2006/0106270 A1 | 5/2006 | Glover et al. |
| 2006/0161035 A1 | 7/2006 | Kalnes et al. |
| 2011/0147264 A1* | 6/2011 | Sadler ............... C10G 65/10 208/59 |
| 2017/0121237 A1 | 5/2017 | Ilias et al. |
| 2017/0137342 A1* | 5/2017 | Behkish ............... C07C 1/20 |
| 2018/0369774 A1 | 12/2018 | Lambert |
| 2020/0398213 A1* | 12/2020 | Behkish ............... B01J 8/085 |
| 2020/0398220 A1 | 12/2020 | Behkish et al. |
| 2020/0398241 A1* | 12/2020 | Kovvali ............... C10G 47/28 |

OTHER PUBLICATIONS

Euzen, Jean-Paul Trambouze, Pierre "Three-Phase Reactors: Gas, Liquid, and Catalytic Solid", Chemical Reactors from Design to Operation, Editions Technip, pp. 485-550, 2004.

Han et al., "Particle transport by jet pump in a new liquid-solid circulating moving bed reactor", Chemical Engineering Journal vol. 84, pp. 491-496, 2001.

Iliuta, et al. "Catalytic Wet Oxidation in Three-Phase Moving-Bed Reactors: Modeling Framework and Simulations for On-Stream Replacement of a Deactivating Catalyst", Industrial &Engineering Chemistry Research, vol. 52, pp. 370-383, 2013.

Weisz, et al; "Superactive Crystalline Aluminosilicate Hydrocarbon Catalysts"; Journal of Catalysis, 1965, vol. 4, p. 527.

Miale, et al; "Catalysis by Crystalline Aluminosilicates IV. Attainable Catalytic Cracking Rate Constants, and Superactivity"; Journal of Catalysis, 1966, vol. 6 p. 278.

Olson, et al; "Chemical and Physical Properties of the ZSM-5 Substitutional Series", Journal of Catalysis, 1980, vol. 61, p. 395.

* cited by examiner ial Appli-lication Ser. No. 62/865,615 filed Jun. 24, 2019, which is herein incorporated by reference in its entirety.

DISTILLATE PRODUCTION FROM OXYGENATES IN MOVING BED REACTORS

CROSS REFERENCE TO RELATED APPLICATIONS

This application claims priority to U.S. Provisional Application Ser. No. 62/865,615 filed Jun. 24, 2019, which is herein incorporated by reference in its entirety.

FIELD

Systems and methods are provided for formation of distillate boiling range fuels, chemicals, and/or other products by upgrading of oxygenates in moving bed reactors.

BACKGROUND

Moving bed reactors are a type of reactor that is potentially suitable for reactions where a fluid phase is exposed to catalyst and/or other solid particles at specified temperature and pressure conditions. Moving bed reactors provide an advantage due to the movement of the solid particles. Because the solid particles flow within the reactor, it is relatively easy to withdraw catalyst from a moving bed reactor on a periodic basis to regenerate the catalyst.

Although moving bed reactors can facilitate catalyst regeneration, transfer of multiple phases between moving bed reactors can present difficulties. In particular, moving bed reactors are not conventionally used in situations where a three phase, e.g., gas/liquid/solid, co-current flow is transferred from a first moving bed reactor to a second moving bed reactor. Because each phase of the three-phase flow has different flow properties, attempting to transfer a three-phase flow by conventional methods can result in uneven distribution of one or more flow phases. Such uneven distribution can lead to substantially reduced activity, temperature spikes, increased catalyst deactivation, and/or various other poor performance characteristics. Additionally, conventional methods of transferring a three-phase flow can suffer from limits on the ability to independently control the input flow rate of each phase into the reactor.

One option for overcoming the difficulties with managing co-current flow in a moving bed reactor is to use a counter-current flow reactor, where the direction of travel for the solid particles is the opposite of the direction of travel for the fluid phases. U.S. Pat. Nos. 4,968,409 and 5,916,529 provide examples of moving bed reactors designed for counter-current flow. The reactors include a distributor that corresponds to a cone for guiding the catalyst particles into a pipe as the catalyst moves down through the reactor. The cone distributor includes openings to allow gas to pass through the cone. The cone distributor also includes liquid conduits to transfer fluid from a reservoir up to the catalyst in the cone distributor. While a counter-current flow reactor can handle a three-phase flow, managing the three-phase flow is difficult. For example, the flow rates for each phase need to be balanced to avoid flooding of the reactor. Additionally, the residence time for contact between the liquid and the catalyst particles is relatively high, so reactions requiring a short contact time between the liquid and the solid phases are not suitable for this type of counter-current reactor configuration.

European Patent Application EP 0552457 describes another example of a counter-current moving bed reactor configuration.

U.S. Pat. Nos. 7,371,915 and 7,414,167 describe co-current moving bed reactor systems for conversion of oxygenates to propylene. Because the conversion reaction converts low molecular weight oxygenates to propylene, liquid is not formed in the reactors.

U.S. Pat. No. 8,323,476 describes moving bed hydroprocessing reactors for hydroprocessing of liquid feeds. The amount of hydrogen introduced into the reactors is limited so that a continuous liquid phase is maintained within the hydroprocessing reactors. The liquid is contacted with the solids in a radial flow configuration.

U.S. Pat. No. 5,849,976 describes a moving bed solid catalyst hydrocarbon alkylation process. The reaction zone is operated at liquid phase conditions.

U.S. Pat. No. 9,162,205 describes a co-current moving bed reactor system for contacting fluids with adsorbent particles. Due to the nature of an adsorbent/desorbent system, maldistribution of fluid flow within the reactor may lead to reduced performance, but does not otherwise result in problems due to excessive reaction of fluids with catalyst particles.

U.S. Patent Application Publication 2017/0121237 describes a two reactor system for conversion of oxygenates to naphtha and distillate. A first reactor is used to convert the oxygenates to a mixture that includes olefins. After passing through a separation stage, at least a portion of the olefins are then passed into a second reactor for oligomerization of olefins to form naphtha and distillate boiling range compounds.

U.S. Patent Application Publication 2017/0137342 describes multi-phase separators for use in producing oxygenates and olefins from hydrocarbons. The multi-phase separators are described as being suitable for use in moving bed reactors.

What is needed are systems and methods to enable transfer of a co-current three-phase flow from one moving bed reactor to another moving bed reactor when performing reactions, such conversion of oxygenates to distillate boiling range compounds, where it is desirable to control contact time of fluids with catalyst while also managing flow uniformity. This can include having the ability to separate a three-phase flow so that each phase can be separately introduced at a controlled rate. This can further include introducing each phase in a manner that results in substantially uniform mixing of the phases.

SUMMARY

In an aspect, a method for upgrading a feed to form distillate boiling range compounds is provided. The method can include passing a catalyst flow comprising a catalyst into a first moving bed reactor of a plurality of serially connected moving bed reactors. The first moving bed reactor can include a first reactor feed inlet and a first reactor effluent outlet. The catalyst can include at least one of oxygenate conversion catalyst and olefin oligomerization catalyst. The method can further include exposing a feed to the catalyst flow in the first moving bed reactor under first reaction conditions to form a first partially reacted effluent. The first reaction conditions can include at least one of oxygenate conversion conditions and oligomerization conditions. A temperature differential between the first reactor feed inlet and the first reactor effluent outlet can be 85° C. or less. The method can further include stripping the catalyst flow with a first stripping fluid to separate at least a portion of the first partially reacted effluent from the catalyst flow. The at least a portion of the first partially reacted effluent can include a liquid phase effluent portion and a vapor phase effluent portion. The method can further include passing the stripped catalyst flow into a second moving bed reactor of the plurality of serially connected moving bed reactors. The method can further include passing the liquid phase effluent portion into the second moving bed reactor as a substantially axial flow. Additionally, the method can further include exposing the vapor phase effluent portion to the stripped catalyst flow in the presence of the liquid effluent portion in the second moving bed reactor under second reaction conditions to form a second effluent including distillate boiling range compounds. The second reaction conditions can include at least one of oxygenate conversion conditions and oligomerization conditions.

In some aspects, the feed can include at least a portion of an effluent from a third moving bed reactor of the plurality of serially connected moving bed reactors.

In some aspects where the catalyst comprises olefin oligomerization catalyst and where the first reaction conditions comprise oligomerization conditions, the method can further include converting an oxygenate feedstock in one or more reactors to form a conversion effluent comprising a conversion total hydrocarbon product, the conversion total hydrocarbon product comprising 20 wt % or more olefins. In such aspects, the feed can include at least a portion of the conversion total hydrocarbon product.

In another aspect, a system for upgrading oxygenates is provided. The system can include a first plurality of serially connected moving bed reactors. Each moving bed reactor in the first plurality of serially connected moving bed reactors can include a catalyst inlet, a feed inlet, a stripping fluid inlet, a catalyst outlet, and a vapor phase effluent outlet. The system can further include a separation stage comprising a separation stage inlet and one or more separation stage outlets, the separation stage inlet being in fluid communication with at least at least one vapor phase effluent outlet. The system can further include a second plurality of serially connected second moving bed reactors. Each moving bed reactor in the second plurality of serially connected moving bed reactors can include a second catalyst inlet, a second feed inlet, a second stripping fluid inlet, a second catalyst outlet, a second liquid phase effluent outlet, and a second vapor phase effluent outlet. At least one second feed inlet can be in fluid communication with at least one of the one or more separation stage outlets. The system can further include a second separation stage comprising a second separation stage inlet and one or more second separation stage outlets, the separation stage inlet being in fluid communication with at least one second liquid phase effluent outlet and at least one second vapor phase effluent outlet. Additionally, the system can further include a regenerator comprising a first regenerator inlet, a first regenerator outlet, a second regenerator inlet, a second regenerator outlet, an oxygen inlet, and a flue gas outlet. The first regenerator inlet can be in solids flow communication with at least one catalyst outlet and/or the second regenerator inlet being in solids flow communication with at least one second catalyst outlet. Additionally or alternately, the first regenerator outlet can be in solids flow communication with at least one catalyst inlet and/or the second regenerator outlet can be in solids flow communication with at least one second catalyst inlet.

DETAILED DESCRIPTION

Figure 1:
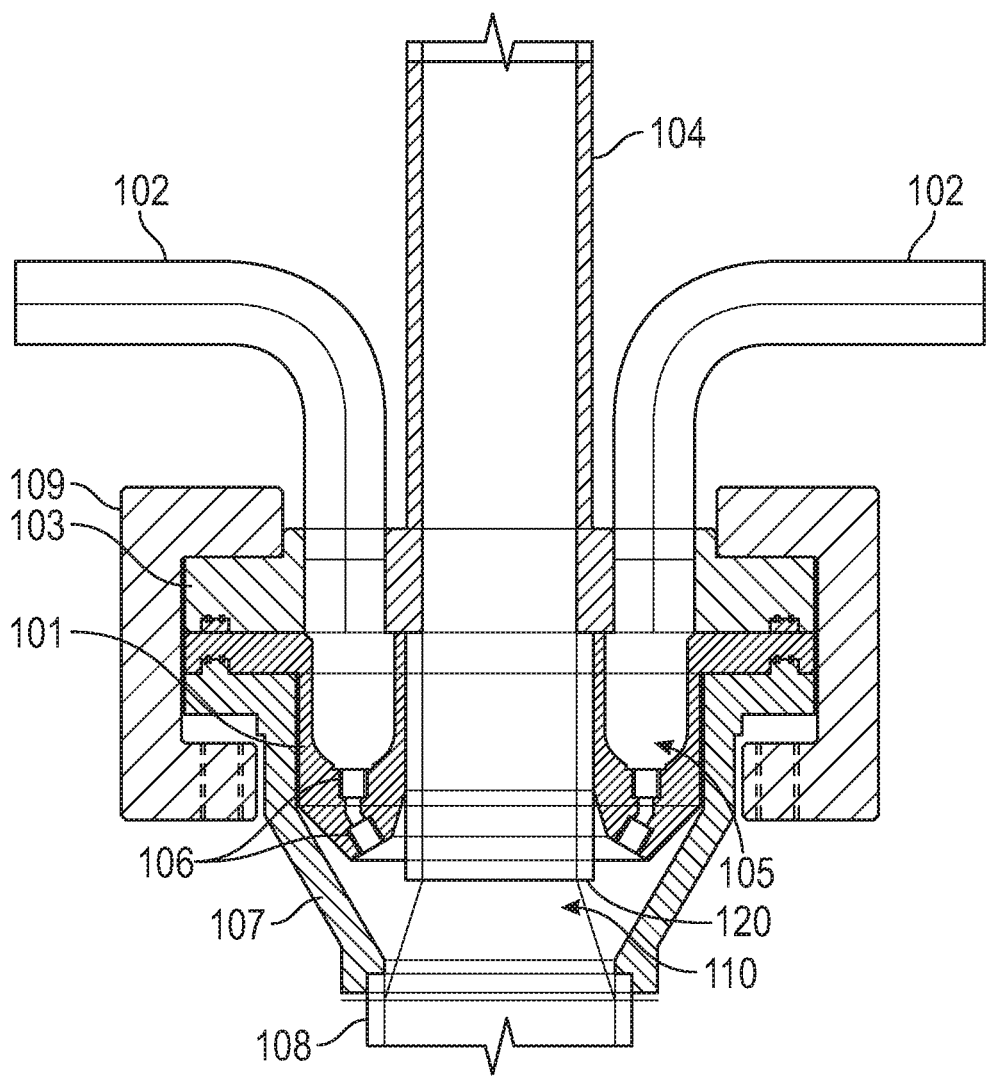
FIG. 1 shows a side view of an example of a feed distribution apparatus.

All numerical values within the detailed description and the claims herein are modified by "about" or "approximately" the indicated value, and take into account experimental error and variations that would be expected by a person having ordinary skill in the art.

Overview

In various aspects, systems and methods are provided for conversion of oxygenate feeds to distillate boiling range products using multiple moving bed reactor stages. The systems and methods allow for multiple stages to be used while avoiding the need for distillation or other boiling point based separation as the mixture of feed and effluent is passed between stages. Instead, a stripping gas is used to disengage the feed and effluent from the catalyst solids. In combination with an improved moving bed reactor design, this can allow substantially all of the feed and effluent from a first moving bed reactor stage to be passed into a second moving bed reactor stage, even when the feed and effluent include both vapor and liquid phase portions.

In some aspects, multiple moving bed reactors can be arranged into two groups of stages. A first group of stages can be operated under conditions that favor oxygenate conversion, while a second group of stages can be operated under conditions that favor olefin oligomerization. In such aspects, an intermediate separation can be performed between the stages for oxygenate conversion and the stages for producing distillate boiling range compounds by oligomerization. In other aspects, the multiple moving bed reactor stages can be operated under a single set of conditions, so that the distillate product is formed without performing an intermediate distillation.

Upgrading of oxygenates to distillate boiling range products is an area of continuing interest, based on the potential for oxygenate conversion to serve as a bridge between natural gas feedstocks (and/or other feeds containing primarily methane and other $C_{4-}$ alkanes) and higher value products, such as distillate fuels and various specialty chemicals. Hydrocarbon reforming is one of the few practical options for conversion of small alkanes. Reforming generates synthesis gas, which can readily be converted to methanol and/or other small alcohols. The methanol (and/or other small alcohols) formed in this manner can then be used as a feedstock for processes that allow for upgrading of oxygenates.

Unfortunately, there are a number of challenges to performing oxygenate conversion to distillate boiling range products at a commercial scale. Some difficulties can be related to the highly exothermic nature of upgrading oxygenates to distillate boiling range compounds. Both conversion of oxygenates to olefins and olefin oligomerization are strongly exothermic reactions. Due to practical considerations, it is desirable to limit the temperature gradient across an oxygenate conversion reactor to roughly 85° C. or less (~150° F. or less). Because of the exothermic nature of oxygenate conversion and/or olefin oligomerization, the limit on temperature gradient across a reactor constrains the size of a reactor and/or the space velocity within a reactor. As a result, managing heat during conversion of oxygenates and oligomerization of olefins generated from oxygenate conversion can pose significant challenges in a fixed bed reactor environment.

Using a plurality of moving bed reactors can mitigate or minimize such heat management difficulties. For example, a plurality of moving bed reactors can be used to perform the conversion and oligomerization reactions. The reactors can be sized and/or operating conditions can be selected so that the amount of temperature increase across a single reactor is less than a target value, such as having a temperature rise of 85° C. (~150° F.) or less across a reactor, or 75° C. or less, or 60° C. or less. An initial feed, which may only correspond to a gas phase feed of oxygenates and light olefins, can then be passed into the first reactor. The plurality of moving bed reactors can then be used to facilitate substantially complete conversion of oxygenates as well as oligomerization of the resulting olefins to a desired degree. This can allow, for example, for conversion of an oxygenate feed (optionally also including light olefins) to distillate boiling range products while avoiding excessive heating within any single reactor.

Other difficulties can be related to maintaining catalyst activity during upgrading of oxygenates to distillate boiling range compounds. Without being bound by any particular theory, it is believed that there are two primary modes of catalyst deactivation for the zeotype catalysts used in oxygenate conversion and olefin oligomerization. One type of deactivation is due to coke formation on the catalyst. As coke accumulates, it is believed that active sites can be blocked, resulting in lower catalyst activity. Fortunately, such coke can be removed by regeneration at high temperature, which can restore a substantial portion (such as up to all) of the activity loss due to coke formation.

In a fixed bed catalyst environment, removal of coke from catalyst can only occur during dedicated regeneration periods. In between such regeneration periods, the primary option for extending run length in a fixed bed reactor to a commercially desirable level is to build a larger catalyst bed. At the start of an oxygenate conversion process, the catalyst near the top of the bed performs most of the oxygenate conversion. This results in coking of the catalyst. As coking deactivates the catalyst near the top of the bed, catalyst at locations farther down in the bed performs an increasing percentage of the oxygenate conversion. Thus, the depth of the fixed bed can be increased so that the run length between regeneration steps is at a desirable level.

Although creating a larger fixed bed can be effective for overcoming difficulties due to coke formation, such increases in the size of a fixed bed can actually increase another type of deactivation. Without being bound by any particular theory, it is believed that a second type of catalyst deactivation can be due to steaming of the catalyst, or in other words exposing the catalyst to water at elevated temperatures.

In addition to forming olefins, the oxygenate conversion reaction generates a substantial amount of water. For example, if methanol is used as the oxygenate feed, two moles of water are generated for each mole of ethene produced by the oxygenate conversion reaction. In a fixed bed environment, at the beginning of an oxygenate conversion reaction, the catalyst near the top of the catalyst bed can perform substantially all of the oxygenate conversion. This results in creation of water, which then is exposed to the remaining portion of the catalyst bed as the feed and effluent passed through the bed toward the reactor exit. As the depth of a catalyst bed is increased to provide longer run length between regeneration, a corresponding increase occurs in the amount of steaming that is performed on catalyst near the bottom of the bed. Thus, by the time that catalyst near the bottom of the bed starts to participate in oxygenate conversion, such catalyst can undergo substantial deactivation due to catalyst steaming.

Using a plurality of moving bed reactors can reduce or minimize the impact of both of the above types of catalyst deactivation. With regard to deactivation due to coking, the size of a moving bed reactor can be selected relative to the expected velocity of catalyst within the moving bed, so that the catalyst can be regenerated with a desired frequency. This can maintain coke on catalyst at less than a target level. With regard to deactivation due to steaming, using a moving bed reactor system means that only the catalyst currently participating in a conversion or oligomerization reaction is exposed to steam. When not inside a moving bed reactor, the catalyst can be disengaged from the liquid phase and gas phase portions of the flow. Additionally, catalyst can be replaced at a convenient rate, so that the average steaming exposure of the catalyst is less than a target value. Thus, using a plurality of moving bed reactors can both reduce the amount of catalyst exposure to steam relative to the amount of feed processed, and can also allow for control over the average steam exposure prior to replacement of the catalyst particles.

In various aspects, upgrading of oxygenates in a multi-stage moving bed reactor system can be facilitated by using moving bed reactors that include a feed distribution apparatus that is suitable for introducing a 3-phase flow under co-current flow conditions. The feed distribution apparatus can allow for separate introduction of liquid and solids in a manner that allows for even distribution of liquid within the solids. The gas portion of the flow can be introduced in any of a variety of convenient manners for distributing gas into a liquid or solid flow.

The distribution apparatus allows for efficient and/or substantially even distribution of a co-current axial liquid flow in a solid particle flow based on the relative angle of introduction for the liquid and the solid particles. The solid particles can be introduced into the reactor by allowing the particles to drop under gravitational pull. The conduit dropping the particles can also be narrower than the portion of the reactor that is receiving the particles. This can result in the solid particles forming a cone based on the angle of repose for the solid particles. The liquid can then be introduced at a plurality of locations around the cone. The distribution channels for introducing the liquid can be angled at the exit point, so that the liquid has a lateral velocity component. Introducing the liquid with a lateral velocity component can facilitate mixing of the liquid with the solid particles. However, even though the liquid initially has a lateral velocity component, at least a majority of the liquid travels axially with the catalyst through substantially the full length of the reactor prior to disengagement of the majority of the liquid from the solids. Any gas in a three-phase flow can be contacted with the solid and liquid in an axial flow manner, a radial flow manner, or in any other convenient manner that allows for a desired distribution pattern.

Because the solid particles are being dropped into the reactor to allow formation of a cone, several options are available for controlling the rate of catalyst flow through the moving bed reactors. In some aspects, the flow rate of catalyst particles through a moving bed reactor can be controlled using a catalyst flow controller valve at the bottom of the reactor. This type of control over the catalyst flow through a moving bed reactor can be used in any convenient configuration one or more moving bed reactors. Using a catalyst flow controller valve at the bottom of a reactor can also limit the flow of catalyst delivered to the next moving bed reactor. Limiting the catalyst flow rate into a reactor can ensure that sufficient space is available in the reactor volume for the desired cone to form at the angle of repose. In addition to the catalyst flow controllers at the bottom of each reactor, a catalyst flow controller can also be included between the catalyst source and the first reactor in a series of reactors. For example, a flow controller can be placed at the exit of a catalyst regenerator that is used to provide regenerated catalyst to the first reactor in a series of reactors. An example of a suitable flow controller is described in U.S. Pat. No. 10,188,998.

In other aspects where a plurality of moving bed reactors are arranged as a vertical stack, the flow rate to all of the reactors in the vertical stack can be controlled using two catalyst flow controllers, plus the geometry of the transfer conduit(s) between reactors. In this type of configuration, a substantial portion of the flow rate control can be dependent on gravity-assisted flow control. One of the flow controllers can be used to control the catalyst flow rate into the first or top reactor in the vertical stack of reactors. A second flow controller can be used at the bottom of the final reactor in the vertical stack. This can control the overall flow of catalyst through the series of reactors. The geometry of the conduits between the reactors can then be used to control the flow rate of catalyst between reactors. In particular, the conduit size between reactors can narrow to restrict flow of catalyst between reactors. This can allow sufficient head space to be available at the top of each catalyst bed so that a cone of catalyst can form at the angle of repose.

It is noted that the distributor apparatus can work in conjunction with methods for separating a three-phase flow as the flow exits from the moving bed reactor. The flow exiting a moving bed reactor can correspond to a oxygenate conversion effluent, an oligomerization effluent, or an oxygenate upgrading effluent (when a single series of reactors is used for both oxygenate conversion and olefin oligomerization). By separating the three-phase flow into gas, liquid, and solid components, the components can be re-combined in a subsequent moving bed stage using the distributor apparatus. The separation of the fluid phases from the catalyst flow can be effective for separating 95 mol % or more of the hydrocarbons in the oxygenate upgrading effluent/conversion effluent/oligomerization effluent from the catalyst flow.

One example of a suitable method for separating the three-phase flow into gas, liquid, and solid components can be to use a stripping gas in combination with concentric pipes to allow for separate capture of the gas and liquid. For example, the stripping gas can be passed through the solid particles at a location prior to the solids exit conduit. This can cause any liquids and gases entrained with the solid particles to be driven out of the volume containing the solids and into a separate volume, such as an outer pipe of a pair of concentric pipes. The wall between the inner pipe and the outer pipe can include protected openings, such as bubble caps, that allow transport of gas from the outer pipe to the inner pipe while minimizing transport of liquids. The liquids can instead accumulate at the bottom of the outer pipe and exit from openings that can be accessed when the accumulated liquid level is sufficiently high. U.S. Patent Application Publication 2017/0137342 shows an example of this type of structure.

In this discussion, the "solids volume" within a reactor is defined as the volume that receives solid catalyst particles to form the moving bed. In various aspects, the solid particles are introduced at or near the top of the solids volume, and form a cone at the angle of repose for the solid particles. The solids volume includes the solids exit volume, where the mixture of solids, liquid, and any remaining gas are stripped from the solids using a stripping gas. In some aspects, the bottom of the solids exit volume corresponds to the bottom of the solids volume. In other aspects, the bottom of the solids volume can correspond to the bottom of the exit port(s) for the stripping gas used in the solids exit volume.

In this discussion, the "reaction zone volume" corresponds to a region within the solids volume. The top of the reaction zone volume corresponds to the base of the cone that forms at the angle of repose in the solids volume. The bottom of the reaction zone volume corresponds to the beginning or top of the solids exit volume, where the solids are contacted with stripping gas. The top of the solids exit volume can be defined based on a change in the geometry, such as the transition from a cylinder or annular shape to a cone shape, or the top of the solids exit volume can correspond to the top of the exit port(s) for the stripping gas used in the solids exit volume.

In this discussion, operating a reactor to have a majority of the liquid travel axially with the solid particles can be characterized based on one or more of the following features. In some aspects, 40 vol % or more (or 50 vol % or more) of the liquid that contacts the solid particles in the reactor can be initially brought into contact with the solid particles in the top 20% of the volume occupied by the solid particles, such as up to substantially all of the liquid. In other words, regardless of the length of the contact time with the particles, the initial contact can be in the top 20% of the volume occupied by the solid particles. In many aspects, this will have substantial overlap with the top 20% of the solids volume, but the top 20% of the volume occupied by the solid particles can differ from the top 20% of the reaction zone volume in the reactor if there is substantial distance between the top level of the solid particles and the top of the reactor. By definition, any liquid that first comes into contact with a top surface of the catalyst bed in the moving bed reactor corresponds to liquid that first contacts the top 20% of the volume occupied by the solid particles.

Additionally or alternately, in some aspects 40 vol % or more (or 50 vol % or more) of the liquid that contacts the solid particles can be separated from the solid particles in the bottom 20% of the volume occupied by the solid particles, such as up to substantially all of the liquid. In many aspects, this will have substantial overlap with the bottom 20% of the reactor volume, but the bottom 20% of the volume occupied by the solid particles can differ from the bottom 20% of the volume in the reactor if there is substantial distance between the bottom level of the solid particles and the bottom of the reactor volume.

It is noted that "top" and "bottom" are relative to the direction of the co-current flow of liquid and solid particles within the reactor. In various aspects, it can be convenient to align the direction of flow with the direction of gravitational force, in order to reduce or minimize maldistribution of liquid relative to the solid particles due to gravitational pull. However, if a reactor is oriented in another manner, the "top" and "bottom" of the solid particle bed can be defined so that the "top" corresponds to where solid particles are added to the bed and the "bottom" corresponds to where solid particles are removed from the bed (such as by exiting the reactor and passing into a transfer pipe). It is noted that in an upflow configuration, this would result in the "top" of the moving bed being closer to the bottom of the reactor, while the "bottom" of the moving bed would be closer to the top of the reactor.

In this discussion, operating a moving bed reactor with a three-phase flow corresponds to operating a reactor where 45 vol %-70 vol %, or 50 vol % to 70 vol % of the reaction zone volume corresponds to a solid (particles) phase; 10 vol % or more of the reactor volume corresponds to a liquid phase, such as 10 vol % to 45 vol %, or 20 vol % to 45 vol %, or 10 vol % to 35 vol %, or 20 vol % to 35 vol %, or 10 vol % to 30 vol %, or 10 vol % to 25 vol %; and 5 vol % or more of the reactor volume corresponds to a gas phase, such as 5 vol % to 40 vol %, or 10 vol % to 40 vol %, or 5 vol % to 35 vol %, or 5 vol % to 30 vol %, or 10 vol % to 30 vol %, or 5 vol % to 25 vol %, or 5 vol % to 20 vol %.

In this discussion, fluid communication is defined as the ability for vapor and liquid to move between two process elements. Vapor communication is defined as the ability for vapor to move between two process elements, while having reduced, limited, or optionally no movement of liquid between such process elements. Solids flow communication is defined as the ability for solid particles to move between two process elements, which typically means that fluid communication is also possible.

Serial Moving Bed Reactors for Upgrading Oxygenates

In various aspects, a plurality of moving bed reactors, arranged for serial processing, can be used for upgrading of oxygenates to form distillate boiling range compounds. The plurality of reactors can be any convenient number that allows conversion of the feed to reach a desired level of completion. In some aspects, the number of reactors can be selected to allow for substantially complete conversion of an oxygenate feed to olefins. In other aspects, the number of reactors can be selected to achieve a desired level of oligomerization (such as a desired yield of distillate boiling range compounds) for the olefins formed during oxygenate conversion.

Some considerations for selection of reactor size and number of reactors can be related to managing the temperature gradient across each reactor. Preferably, the temperature gradient across a single reactor can be 80° C. or less (~150° F. or less), or 70° C. or less, or 60° C. or less. Due in part to higher feed concentration of oxygenates at the beginning of a series of reactors, if a series of reactors includes equal amounts of catalyst (i.e., reactors of equal size), the temperature gradient across the first reactor in the series, and then decrease across each successive reactor. For example, for three reactors in series, the temperature gradient across the first reactor would be larger than the temperature gradient across the second reactor, while the second reactor temperature gradient would be larger than the third reactor temperature gradient. In order to account for this, the size/amount of catalyst for reactors later in the series can be larger than reactors earlier in the series. This can increase the time of catalyst exposure to feed in the later reactors. In some aspects, this can be used to allow two or more reactors in series to have a similar temperature gradient, such as up to all reactors in a series. In other aspects, the first reactor in a series can have a different, smaller size/smaller amount of catalyst than at least one other reactor in the series, with each reactor in the series being at least as large/containing at least as much catalyst as the prior reactor. Still other potential methods for selecting reactor size/catalyst amount can also be used. It is noted that catalyst amount refers to the amount of catalyst used during operation of a moving bed reactor. Thus, in configurations where a separate catalyst flow controller is used after each reactor, it can be possible to have moving bed reactors with different amounts of catalyst even though the volume for holding catalyst in each reactor is similar.

With regard to managing temperature, during or after removal of catalyst and fluids from a reactor, one or more steps can be taken to reduce the temperature in the next reactor. For example, the stripping gas used to disengage fluids from the catalyst can also serve as a quench gas. This can allow the inlet temperature two or more reactors in a series, such as up to each reactor in a series, to be substantially similar. Reactors can be considered to have substantially similar inlet temperatures if the average temperature of catalyst and fluid entering the reactor is within 10° C. The average temperature of catalyst and fluids entering a reactor can correspond to a weighted average based on the weight of each component entering the reactor during a unit time.

Other considerations for selection of reactor size and/or number of reactors can be related to the desired product for a series of reactors. In some aspects, both oxygenate conversion and olefin oligomerization can be performed in a series of reactors. In such aspects, the space velocity and other reaction conditions can be selected to balance conversion of oxygenates within the feed with oligomerization of the resulting olefins. In other aspects, two series of reactors can be used so that separate conditions can be provided for oxygenate conversion and olefin oligomerization. For example, even though the same zeotype catalyst can be used for both oxygenate conversion and olefin oligomerization, favorable conditions for olefin oligomerization tend to correspond to lower temperatures and higher pressures relative to favorable conditions for oxygenate conversion. In such aspects, reactor sizes and conditions in a first series of reactors can be selected to provide substantially complete conversion of oxygenates, while reactor sizes and conditions in a second series of reactors can be selected to provide a desired level of oligomerization.

Configuration Example 1—Vertically Stacked Reactors

One option for arranging reactors in series can be to use a vertical stack of reactors. This can allow gravity-assisted flow to be used to manage the flow of catalyst between reactors.

Figure 6:
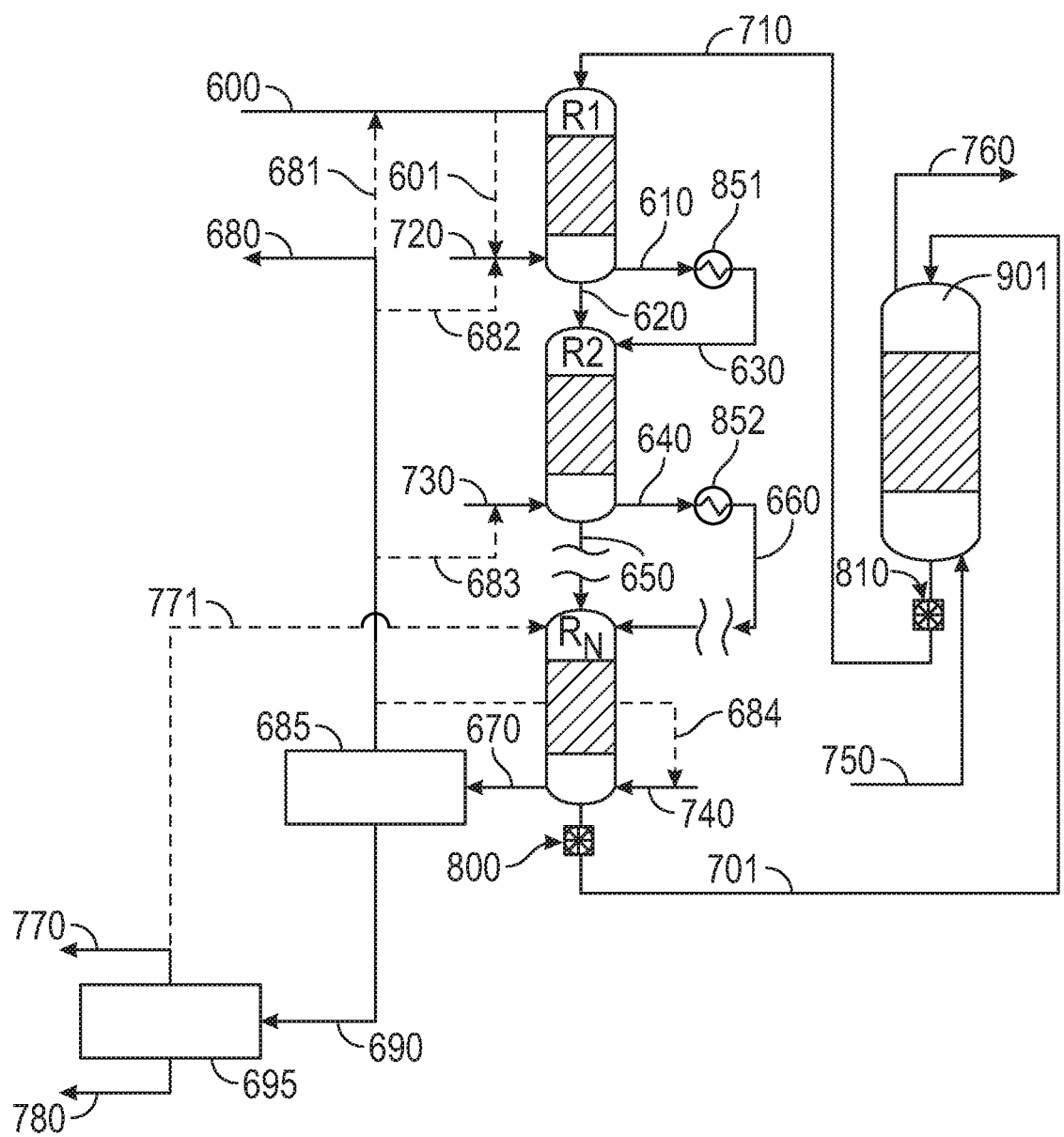
FIG. 6 shows a vertical stack configuration of serially connected moving bed reactors.

FIG. 6 shows an example of a series of moving bed reactors arranged as a vertical stack. In a configuration such as FIG. 6, the reactors in the vertical stack can correspond to reactors R1-Rn, where n is greater than or equal to 2, with R1 corresponding to the initial entry point for feed and Rn corresponding to the final reactor in the series.

In FIG. 6, an oxygenate feed 600 such as methanol, dimethyl ether, or both, and a quench feed such as water or an inert gas, are introduced at the top of the first stage reactor R1. A flow 710 of catalyst particles enter the first stage reactor R1 at the top of the reactor. The reactor could be either axial or radial flow with respect to flow of vapor in the reactor. To the degree that a liquid portion is present in the feed in first stage reactor R1 or any subsequent stage, the liquid portion of the feed can substantially flow axially through the reactor. As the reaction takes place, the heat release from the exothermic dehydration of the oxygenates (for conversion to olefins) increases the temperature inside the reactor bed, and also deposits coke on the catalyst particles. The first stage reactor R1 contains the highest extent of reaction caused by the reaction of the fresh feed over the active catalyst. Therefore, in some aspects, the amount of catalyst included in reactor R1 can correspond to the smallest amount of catalyst in reactors R1-Rn. At or near the bottom of R1, the unreacted feed and products 610 are separated from the catalyst and removed using a stripping fluid 720 such as water, an inert gas, or a portion of the tail gas 682 from product separation unit 685. Optionally, additional feed 601 could also be injected as part of stripping fluid 720 if staged injection is desired. After disengagement of fluids, the catalyst particles exit R1 through a downcomer line 620 that connects R1 to R2. The stripping fluid 720 could also act as the interstage quench. Similarly, interstage heat exchanger 851 can be used to further control the temperature of the 630 stream before the inlet to R2. The second stage reactor R2 operates in the same manner as the previous stage R1. As the reaction progresses, the catalyst particles continue to coke and deactivate. At the bottom of R2 stripping fluid 730 is introduced to separate and remove the remaining unreacted feed and products 640 from the catalyst. The stripping fluid could be water, inert gas, or portion of the tail gas 683 from product separation unit 685. An interstage heat exchanger 852 can be used to adjust the temperature of stream 660 before the inlet to the next subsequent stage. A downcomer line 650 connects R2 to the next stage reactor for the transfer of the catalyst. This process continues all the way through the last stage Rn where full conversion of the reactant occurs. The final products are removed using a stripping fluid stream 740. The stripping fluid could be water, inert gas, or portion of the tail gas 684 from product separation unit 685. The resulting effluent stream 670 is sent to a first separation unit block 685 which could be a flash tank or a distillation column. In the example shown in FIG. 6, the lighter gases 680 (such as tail gas) are separated from the main liquid products 690. All or, portion of the tail gas can be recycled back 681 for use in the feed to the reaction system, and/or recycled 682, 683, and/or 684 for use as stripping fluid in one or more stages of the reaction system. The liquid product 690 from the first separation unit 685 can further be fractionated in a second separation unit 695 into a gasoline cut $C_{9-}$ 770 and a distillate cut $C_{9+}$ 780. A portion or all of the gasoline cut 771 can be recycled back to the appropriate last stages of the reactor to improve the oligomerization reaction and produce heavier molecular weight product (e.g., increase distillate make). The products from the second separation unit can be further fractionated and/or hydrotreated as needed.

The flow of the catalyst in the reactor is maintained using a gravity-assisted catalyst flow controller valve 800 at the exit of the last stage reactor Rn. The coked catalyst exits Rn and is conveyed 801 to a regenerator unit 901 where air 750 is introduced at the bottom. The deposited coke on the catalyst particles is burnt with the oxygen in the air, resulting in generation of $CO_2$ and steam. The flue gas 760 from the combustion is removed from the top of the regenerator unit. The catalyst flow in the regenerator can be adjusted using a catalyst flow controller valve 810. The regenerated catalyst from regenerator 901 is conveyed back 710 to the top of the first reactor stage R1 for the process to continue. A transfer mechanism (not shown) such as a conveyor belt, a pneumatic conveyor, or a catalyst lift system using steam or other gases can be used to transfer the catalyst particles from regenerator 901 to R1. Additionally, make up catalyst if needed can be added to stream 710.

Configuration Example 2—Horizontal Serial Reactors

Figure 7:
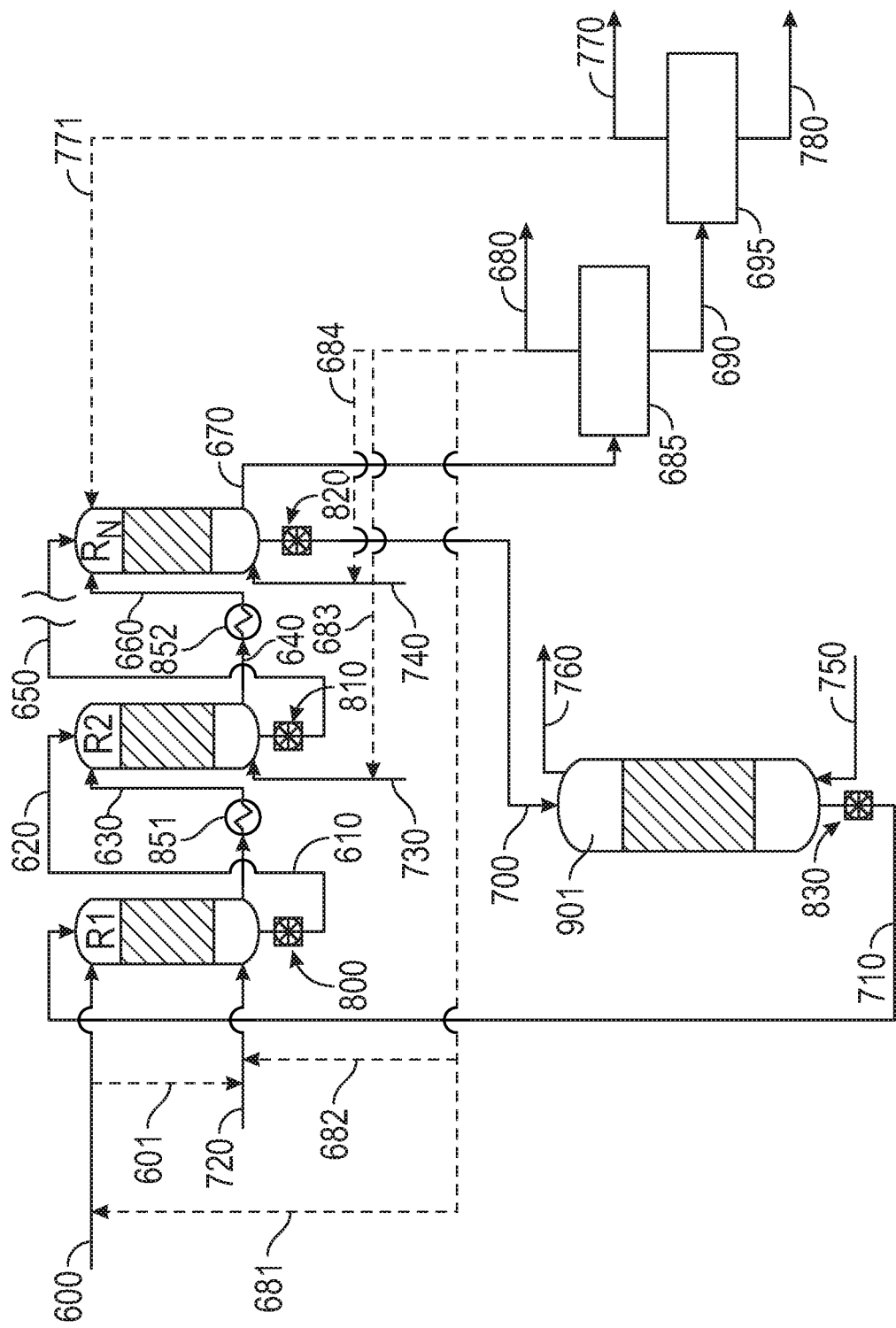
FIG. 7 shows a horizontal configuration of serially connected moving bed reactors.

FIG. 7 shows another example of a potential configuration for a series of reactors. In FIG. 7, the reactors are shown in a horizontal configuration, but any convenient arrangement of reactors (including vertical) could be used for such a configuration. This is due in part to the use of catalyst flow controllers between each moving bed reactor stage, so that the reaction mechanism and coke deactivation in this example is similar to the process described above and shown in FIG. 6. Similarly, since the extent of the reaction is the same, the design and sizes of the reactor stages follow a similar pattern.

In the configuration shown in FIG. 7, an oxygenate feed 600 (including any quench feed) is introduced at the top of the first stage reactor R1. A flow 710 of catalyst particles enter the first stage reactor R1 at the top of the reactor. The reactor could be either axial or radial flow with respect to flow of vapor in the reactor. To the degree that a liquid portion is present in the feed in first stage reactor R1 or any subsequent stage, the liquid portion of the feed can substantially flow axially through the reactor. At the bottom of R1, the unreacted feed and products 610 are separated from the catalyst and removed using a stripping gas or fluid 720. The stripping fluid could be water, inert gas, or portion of the tail gas 682 from product separation unit 685. Additional reactant 601 could also be injected at this location if staged injection is desired. The catalyst particles exit R1 through a transfer line 620 that connects R1 to R2. The flow of the catalyst out of the first stage reactor R1 is maintained using a catalyst flow controller valve 800. A transfer mechanism (not shown) such as a conveyor belt, a pneumatic conveyor, or a catalyst lift system using steam or other gases can be used to transfer the catalyst particles from R1 to R2. The stripping gas 720 also acts as the interstage quench. Similarly, interstage heat exchanger 851 can be used to further control the temperature of the stream 630 before the inlet to R2. The second stage reactor R2 operates in the same manner than the previous stage R1. As the reaction progresses, the catalyst particles continue to coke and deactivate. At the bottom of R2 stripping gas/quench 730 is introduced to separate and remove the remaining unreacted feed and products 640. The stripping fluid could be water, inert gas, or portion of the tail gas 683 from product separation unit 685. An interstage heat exchanger 852 can be used to adjust the temperature of stream 660 before the inlet to the next subsequent stage. A catalyst transfer line 650 connects R2 to the next stage reactor for the transport of the catalyst. Catalyst flow controller valve 810 adjusts the flow of the particles in R2. A transfer mechanism (not shown) such as a conveyor belt, a pneumatic conveyor, or a catalyst lift system using steam or other gases can be used to transfer the catalyst particles from R2 to the next reactor stage. This process continues all the way through the last stage Rn where full conversion of the reactant occurs. The final products are removed using a stripping gas/quench stream 740 and the effluent stream 670 is sent to a recovery block. The stripping fluid could be water, inert gas, or portion of the tail gas 684 from product separation unit 685. The effluent stream 670 is sent to a first separation unit block 685 which could be a flash tank or a distillation column. The lighter gases 680 (i.e., tail gas) are separated from the main liquid products 690. All or a portion of the tail gas can be recycled back 681 for use in the feed to the reaction system, and/or recycled 682, 683, and/or 684 for use as stripping fluid in one or more stages of the reaction system. The liquid product 690 from the first separation unit can further be fractionated in a second separation unit 695 into a gasoline cut $C_{9-}$ 770 and a distillate cut $C_{9+}$ 780. At least a portion of the gasoline cut 771 can be recycled back to the appropriate last stages of the reactor to improve the oligomerization reaction and produce heavier molecular weight product (e.g., increase distillate make). The products from the second separation unit can further be hydrotreated as needed. The flow of the catalyst in the last reactor stage is maintained using a catalyst flow controller valve 820.

It is noted that in some aspects, the catalyst flow controllers 800, 810, and 820 can be set to the same flow rate to reduce, minimize, or prevent accumulation or depletion in any bed(s). In other aspects, a hopper can be included on top of each bed that is specifically sized for the corresponding flow rate of that bed. In such aspects, each flow controller can be set to a separate rate. For example, in a horizontal configuration including a hopper on top of each reactor, the flow rate of catalyst in each moving bed can be selected based on the rate of deactivation in the corresponding reactor.

The coked catalyst exits Rn and is conveyed 801 to a regenerator unit 901 where air 750 is introduced at the bottom. The deposited coke on the catalyst particles is burnt with the oxygen in the air, resulting in generation of $CO_2$ and steam. The flue gas from the combustion is removed from the top of the regenerator unit 760. The catalyst flow in the regenerator can be adjusted using a catalyst flow controller valve 830. The regenerated catalyst from regenerator 901 is conveyed back 710 to the top of the first reactor stage R1 for the process to continue. A transfer mechanism such as a conveyor belt, a pneumatic conveyor, or a catalyst lift system using steam or other gases can be used to transfer the catalyst particles from regenerator 901 to R1. Additionally, make up catalyst if needed can be added to stream 710. In this type of configuration, the rate of the catalyst flow from one stage to another can be independently adjusted based on performance and process criteria, hence providing an additional degree of freedom to the operation.

Figure 8:
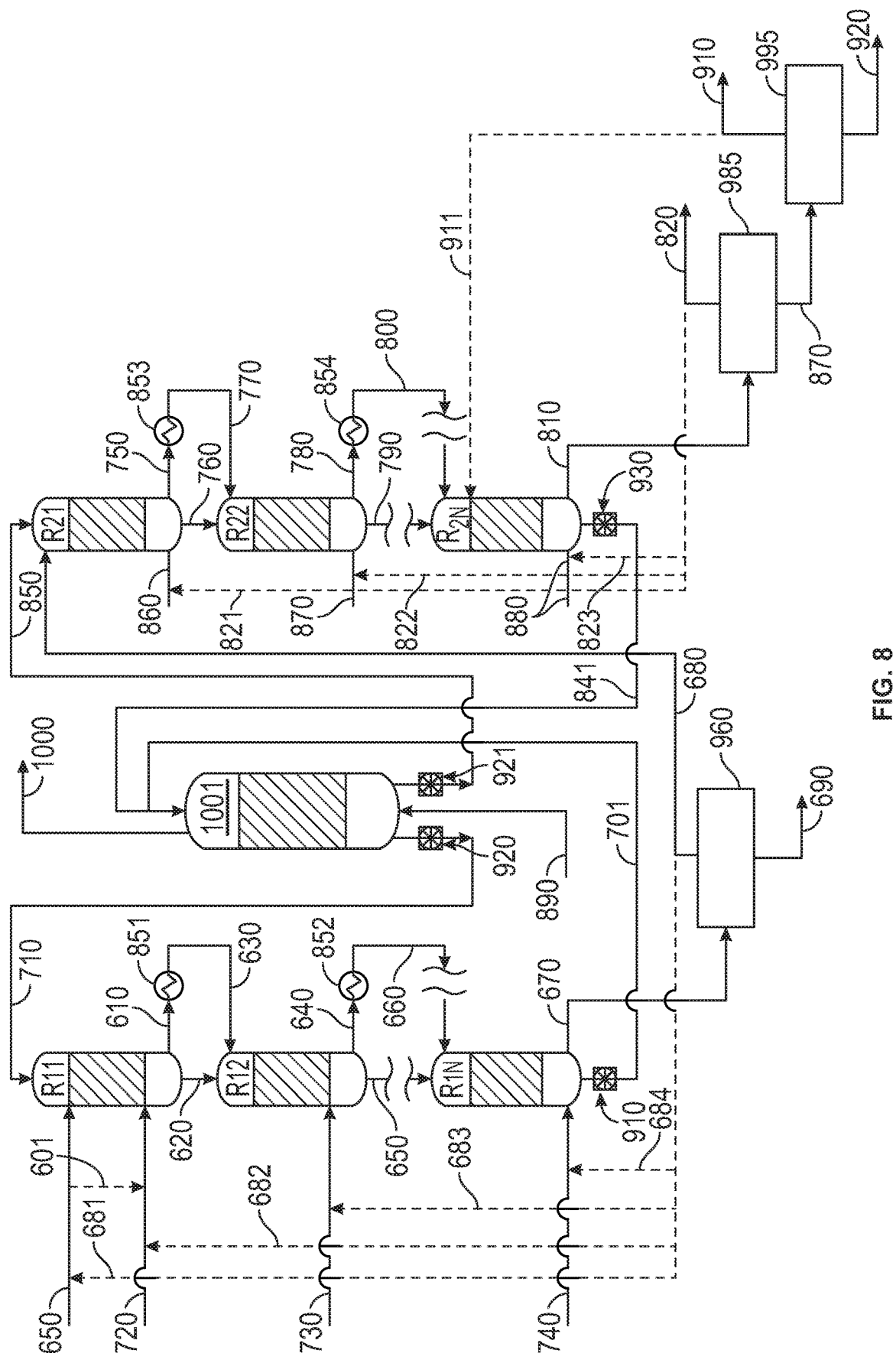
FIG. 8 shows a configuration with separate series of moving bed reactors for performing oxygenate conversion and olefin oligomerization.

Configuration Example 3—Separation of Oxygenate Conversion and Oligomerization Stages FIG. 8 shows yet another configuration example for upgrading of oxygenates to distillate boiling range compounds. In the configuration shown in FIG. 8, two separate series of reactors are used. One series of reactors corresponds to a series of reactors for conversion of oxygenates to olefins, while a second series of reactors receives at least a portion of the conversion effluent as an olefinic feed for oligomerization to form distillate boiling range compounds. Optionally, both series of reactors can correspond to moving bed reactors. Although FIG. 8 shows an arrangement of vertical stacks of reactors, any convenient arrangement can be used, such as a horizontal arrangement.

The oxygenate conversion reaction and the olefin oligomerization reaction can be carried out over the same catalyst or different catalysts. In the former case when the same catalyst is employed in the two reactor systems, a common regenerator unit can be shared between the two as shown in FIG. 8. In this configuration, the oxygenate dehydration reaction, e.g., methanol conversion to olefins, takes place in the first reactor system and the conversion of the olefins to final hydrocarbon fuel and chemicals takes place in the second reactor system. In the latter case where two different catalysts are used, two separate regeneration units can be used. Various potential configurations can be used when separate series of moving bed reactors are used for each reaction. For example, the two reactor systems can have the same number of stages or a different number of stages; the two reactor systems can be both vertically or horizontally stacked, or one stack could be vertical while the other be horizontal; the two reactor systems can both be axial flow or radial flow (for flow of gas), or one reactor system could be radial flow for gas while the other is axial flow.

The configuration in FIG. 8 shows two multi-stage reactor systems stacked vertically, corresponding to reactor series A (for oxygenate conversion) and reactor series B (for olefin oligomerization). The feed 100 enters the first reactor stage A1 in the first stack. The operation in this reactor system is similar to the one described in FIG. 6. The flow of the catalyst is controlled using the catalyst flow control valve 910 at the bottom of the last reactor stage in the first stack. The products from the first reactor stack can be sent to a first separation stage 960. The first separation stage 960 can fractionate the products from the first reactor stack and send the intermediate products 680 to the second reactor stack for further conversion. Any convenient types and/or numbers of separators can be used in separation stage 960. In some aspects, the water formed in the first step can be removed 690 in this separation unit and the intermediate hydrocarbon products such as light olefins can be sent as feed 680 to the second stack reactor system. Optionally, a portion of the product gas 680 can be recycled back 681 for use in the feed to the reaction system, and/or recycled 682, 683, and/or 684 for use as a stripping fluid for one or more stages in the reaction system. The second reactor system has N reactor stages stacked vertically, B1 to Bn. In the configuration shown in FIG. 8, feed 680 enters the first reactor stage B1. Fresh and/or regenerated catalyst 850 also enters reactor stage B1 at the top. The products from each reactor stage (750 and 780) are removed at the bottom using a stripping fluid (860 and 870). The stripping fluid could be water, inert gas, or portion of the tail gas 321 or 322 from the second product separation unit 985. The catalyst is transferred to downstream stages through a downcomer pipe (760 and 790). The removed products and unreacted feed from each stage are further cooled in external heat exchangers (853 and 854). In the last reactor stage Bn, the final product 810 is removed using a stripping fluid 880 and sent to the second product recovery unit 985 where fractionation takes place. For example, fractionation can allow for separation into a tail gas 820 and liquid hydrocarbon products 830. The stripping fluid 880 could be water, inert gas, or portion of the tail gas 823 from the second product separation unit 985. More generally, the tail gas from second separation unit can be recycled 821, 822, and/or 823 for use as stripping fluid in on or more stages of the reaction system. The liquid hydrocarbon product 830 from the second separation unit can further be fractionated in a third separation unit 995 into a gasoline cut $C_{9-}$ 910 and a distillate cut $C_{9+}$ 920. Optionally, at least a portion of the gasoline cut 911 can be recycled back to the appropriate last stages of the reaction system to improve the oligomerization reaction and produce heavier molecular weight product (e.g., increase distillate make). The products from the second separation unit 985 can further be hydrotreated as needed. The final products 920 can further be hydrotreated treated.

The catalyst flow in the second reactor stack is controlled using a catalyst flow controller 930 at the bottom of the last reactor stage Bn. The spent catalysts from both reactor systems are sent to a common regenerator unit 1001. A conveying mechanism system similar to the one described above can be used to transfer the catalysts to the regenerator unit 1001 through conduits 801 and 841 for first and second stack reactor systems respectively. The regenerator works in the same manner described above where air 890 enters at the bottom and the flue gas 1000 exits at the top.

The catalyst flow at the bottom of the regenerator unit can be controlled with one or two catalyst flow controller. The decision will be based on the difference in the rate of catalyst deactivation between the first reactor stack and second reactor stack. If both rates in both reactor stacks are similar, then one catalyst flow controller can be sufficient to distribute back substantially the same catalyst flow to both reactor stacks. If the catalyst deactivation rates between the reactor stacks are different, catalyst flow controller 920 can be adjusted to provide the rate of catalyst to the first reactor stack through line 710 and catalyst flow controller 921 can be adjusted to provide the rate of catalyst to the second reactor stack through line 850.

Configuration Example 4—Example of Distributor Apparatus

In various aspects, upgrading of oxygenates to distillates in moving bed reactors can be performed using reactors that can provide relatively uniform distribution of liquid in the catalyst particles within a moving bed reactor. One option for achieving a relatively uniform distribution is to use a distributor apparatus that can allow uniform distribution of liquid in the catalyst particles under co-current axial flow conditions for the solids and liquids. When using such a distributor apparatus, the vapor flow in the moving bed reactors can correspond to radial flow or axial flow.

FIG. 1 shows an example configuration for a distributor apparatus for a moving bed reactor. The distributor apparatus can be used for moving bed reactors where solids and liquids substantially travel through the reactor as an axial flow, while the gas flow can correspond to an axial flow, a radial flow, or any other convenient flow pattern. In some aspects, the distributor apparatus shown in FIG. 1 can be used in conjunction with a moving bed reactor where the catalyst is introduced along the central axis of the reactor. This can result in the catalyst filling a central volume of the reactor. Such a configuration for a moving bed reactor can be suitable, for example, for a moving bed reactor where the catalyst, liquid, and gas all substantially traverse the reactor as axial flows. In other aspects, multiple instances of the distributor apparatus in FIG. 1 can be arranged to provide catalyst for an annular catalyst volume in a moving bed reactor. This can be beneficial for configurations such as the example shown in FIG. 4, where the catalyst and liquid in the moving bed reactor travel in a substantially axial direction, while the gas in the feed contacts the catalyst as a radial flow.

FIG. 1 shows a side view of an example of a distributor apparatus for distribution of liquid when the solids are introduced along a central axis. In FIG. 1, a liquid distributor plate 101 is shown and highlighted with hatch lines. The liquid distributor plate 101 fits into a moving bed reactor system through a system of connecting parts at the top and bottom of the distributor plate 101. The inlet feed pipes 102 are attached on the side of the top connecting part 103. Depending on the configuration, inlet feed pipes 102 can transport feed into the reactor in the form of gas, liquid, or a combination of gas and liquid. For example, in aspects where the gas portion of a feed contacts the catalyst as a substantially radial flow, inlet feed pipes 102 can transport a liquid portion of the feed into the reactor, with substantially all of the gas entering the reactor as a separate flow.

Figure 2:
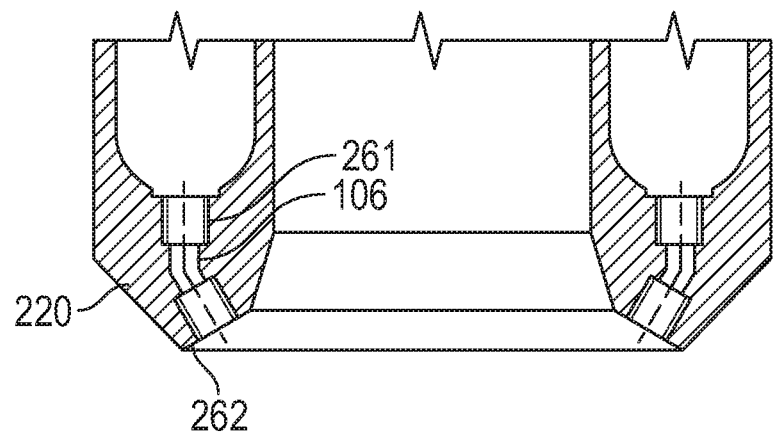
FIG. 2 shows additional details for portions of the feed distribution apparatus in FIG. 1.

In FIG. 1, the catalyst particles enter the vessel through a solids inlet conduit, such as catalyst feed line 104, which is attached in the center of the top connecting part 103. The distributor plate 101 sits below the top connecting part 103. The portion of the feed provided by inlet pipes 102 drops into the distributor plate which includes one or more concave shapes 105 with a radius R (shown in FIG. 2). There are a number of slots (or orifices) 106 placed around the distributor plate. Preferably, the slots can be placed evenly and concentrically around the distributor plate. The slots provide fluid communication between the concave shape(s) 105 and a solids volume 108. As shown in FIG. 2, these slots have a depth at the top 261 of the slots 106 and a depth at the bottom 262 of the slots 106. The slots can optionally be threaded on both ends (i.e., at top 261 and at bottom 262) to allow installation of nozzles at both the top and the bottom (not shown). The nozzles can correspond to, for example, hollow cylinders with an opening at the top to allow the passage of the gas. In some aspects, the nozzles can further include a slit around the top side of the nozzle. This can allow liquid to flow through once a certain liquid height is built. This will prevent selective distribution of the liquid through certain nozzles and allow an even flow of the liquid through all the nozzles. It is noted that the nozzles at the bottom 262 of the slots 106 can have a geometry that is selected to facilitate distribution of the expected type of feed that is passing through the slots 106, such as nozzles selected for distribution of gas, liquid, or a mixture of gas and liquid.

Figure 4:
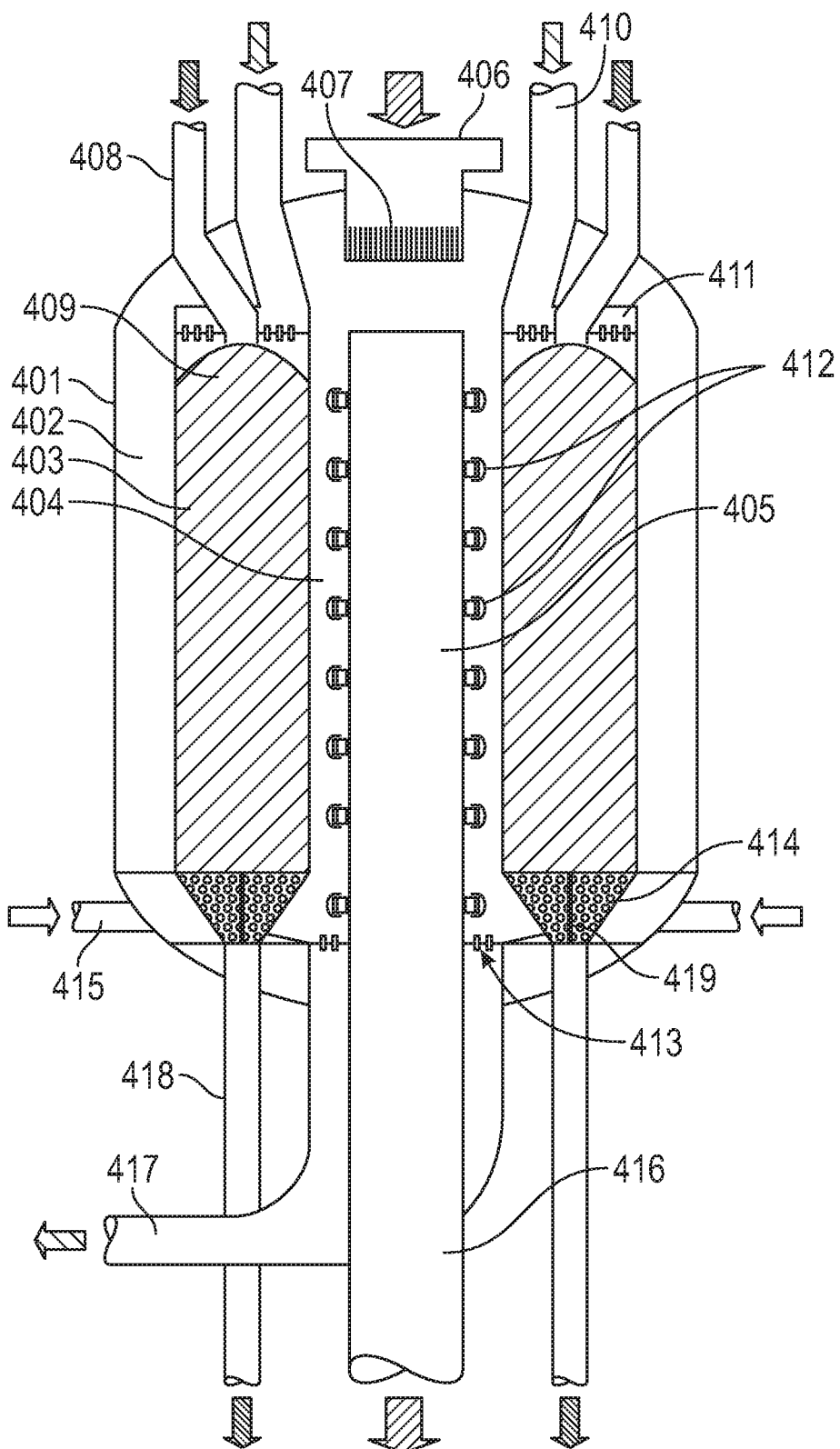
FIG. 4 shows a side view an example of a moving bed reactor.

Depending on the aspect, solids volume 108 can correspond to a single central volume, an annular volume, or another convenient volume that allows for axial flow of catalyst and liquid through a moving bed reactor. In aspects where solids volume 108 corresponds to a central volume in a reactor, a single solids inlet conduit 104 can provide catalyst to the solids volume 108. As another example, in aspects where solids volume 108 corresponds to an annular volume, a plurality of distributor apparatus can be arranged in a substantially symmetric manner around the solids volume 108. Such a configuration is shown in FIG. 4.

In the example of a distributor apparatus shown in FIGS. 1 and 2, the bottom of the distributor plate 101 curves toward the inside of the solids volume at a 45 degree angle (or more generally an angle between 30° and 55°). The gas and/or liquid will enter the nozzles inserted into the distributor plate's slots (or orifices) 106 and first drop a distance prior to then curving inward, such as at angle 272, which corresponds to a 60 degree angle in FIG. 2 (or more generally an angle between 45° and 70°). The gas and/or liquid can then travel a further distance to exit through another (bottom) set of nozzles inserted into slots 106, as shown in FIG. 2. As shown in FIG. 1, the distributor plate sits on top of the bottom connecting part 107 which has a form of a funnel whose bottom diameter is that of the solids volume 108 and top diameter is that of the distributor plate. The top connecting part 103, the distributor plate 101, and the bottom connecting part 107 are held together with a bolted clamp 109. The bottom connecting part 107 can either be welded to the top of the reactor vessel 108, as shown in FIG. 1, or bolted with a flange (not shown).

At the interface 120 between catalyst feed line (or other solids inlet conduit) 104 and solids volume 108, a characteristic width of the catalyst feed line 104 can be smaller than a characteristic width of the solids volume that is receiving the catalyst. The characteristic width of the catalyst feed line 104 corresponds to the longest straight line that can be drawn between two points on the catalyst feed line at the interface 120 with the solids volume 108. In aspects when the catalyst feed line is roughly cylindrical, the characteristic width will be the diameter of the catalyst feed line. The width of the solids volume receiving the catalyst particles can correspond to a) for a central volume, the diameter of a cylindrical volume as measured at the location where the base of the catalyst cone forms in the reactor; b) for an annular volume, the radial distance between the outer surface and the inner surface that define the annular volume, at the location where the base of the catalyst cone forms in the annular volume; or c) a similarly characteristic width for a volume having a shape other than an annular volume or a cylindrical volume.

It is noted that the above definitions for the width of the solids volume are based on the location of where the base of the catalyst cone forms. Above the base of the cone, there can typically be a gap between the interface of the catalyst feed line with the solids volume and the base of the catalyst cone. This gap, which can be referred to as a contact zone or mixing zone, corresponding to the difference between the top of the solids volume and the top of the reaction zone volume, allows the catalyst cone to form at the angle of repose.

During operation, the solid (catalyst) particles exit the catalyst feed line 104 and distribute inside the solids volume 108, forming a conical shape 110 whose angle corresponds to the angle of repose of the solid particles. The conical shape 110 is formed in part because the characteristic width of the solids inlet conduit(s) is smaller than the width of the volume receiving the solid particles. The angle of repose for solid particles can vary, such as having an angle of repose of roughly 10° to 40°. The bottom inner edge of the feed distributor plate where it meets the catalyst feed line bottom can be slightly angled, such as having an angle of 17° for angle 271, as shown in FIG. 2. More generally, angle 271 can range from 10° to 25°. The gas or gas/liquid exiting the distributor plate through exit surface 279, via the bottom nozzles of slots 106, can inject directly on top of the cone of particles (at the angle of repose) formed by the flow of solid particles into the reactor. This will allow enhanced fluid mixing from the top and let the fluid evenly disperse radially as it flows downward. This is due in part to the lateral velocity of the feed toward the central axis, which can assist with having feed well-mixed with particles throughout the reaction zone volume.

In FIG. 2, the complement of angle 272 is angle 273. Angle 273 corresponds to an angle that the exit surface 279 makes relative to a plane defined by interface 120 between the catalyst feed line 104 and the reactor vessel 108. In FIG. 2, angle 273 is shown as having a value of 30°, but more generally angle 273 (i.e., the angle of the exit surface relative to the plane) can have a value between roughly 15° and 45°.

Figure 3:
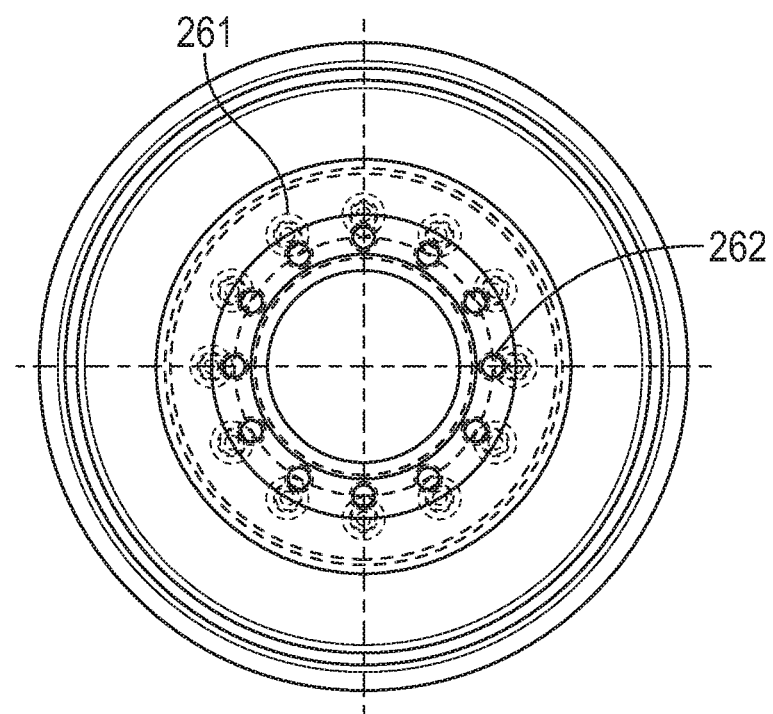
FIG. 3 shows a bottom view of the feed distribution apparatus shown in FIG. 1.

FIG. 3 shows the bottom of the distributor plate. In this schematic there are 12 orifice nozzles at the top 261 and bottom 262. The offset between the center of the top and bottom nozzles as the distributor plate curves inward toward the center of the reactor vessel can also be seen in this figure. In various aspects, the number of the nozzles can be determined based on the scale of the reactor vessel, the optimum distance needed to space the nozzles, and the liquid mass flux.

It is noted that the above description contemplates having a distributor apparatus that is machined as a separate part from other parts of the overall reaction system. In other aspects, the distributor apparatus can be integrated with the overall reaction system in any convenient manner. For example, the distribution plate can be attached to the catalyst feed line (or other solids inlet conduit) 104, so that there is no visible joint between catalyst feed line 104 and the distributor plate. In such an aspect, the "opening" in the distributor plate that allows catalyst to pass from feed line (or other solids inlet conduit) 104 to the solids volume 108 can correspond to a part of the solids inlet conduit 104. It is noted that the attachment between catalyst feed line 104 and the distributor plate can correspond to a removable attachment, or that attachment can correspond to the catalyst feed line 104 and the distributor plate corresponding to a single piece. Alternatively, the distributor apparatus and catalyst feed line 104 can be separate pieces, with the catalyst feed line 104 passing through an opening in the distributor apparatus.

Configuration Example 5—Reactor with Annular Catalyst Volume (Radial Gas Flow)

FIG. 4 shows an example of a moving bed reactor suitable for performing a co-current reaction in the presence of three phases. The reactor in FIG. 4 is designed to introduce the catalyst and liquid into an annular volume. The solid and liquid can flow axially through the annular volume. The gas phase portion of the feed can then be passed through the catalyst and liquid in a substantially radial direction.

In FIG. 4, reaction vessel 401 includes an outer annular volume 402 and an inner annular volume 403. The inner annular volume 403 is the annular region where the catalyst or other solid particles reside, and therefore can be referred to as an annular solids volume. The outer annular volume 402 and inner annular volume 403 are arranged around a central double pipe or conduit, corresponding to an outer central pipe or conduit 404 and an inner central pipe or conduit 405. The inner annular volume 403 can include perforations (not shown) that permit vapor communication between the inner annular volume 403 and outer central pipe 404. The perforations can primarily allow gas to pass into the outer central pipe 404, but some liquid can also pass through the perforations. The perforations are small enough to retain substantially all of the solid particles in the annular solids volume 403.

During operation, gas is introduced into the reactor 401 via a central opening 406 which connects to an inlet pipe 407 with openings for distributing the gas into outer annular volume 402. The tops of inner annular volume 403, outer central pipe 404, and inner central pipe 405 are sealed at the top, so that the flow path for gas to reach the outer central pipe 404 is by passing radially through inner annular volume 403. During operation, solid particles (such as catalyst particles) are introduced into the reactor 401 via a plurality of pipes 408. The outlets of the plurality of pipes 408 are roughly centered over the mid-point of inner annular volume 403. Similar to the configuration shown in FIG. 1, the solid particles fall into the inner annular volume 403 and form cones 409 corresponding to the angle of repose for the particles. The liquid phase is passed into reactor 401 via a plurality of liquid conduits 410. The liquid conduits 410 feed a plurality of slots or openings 411 that are arranged around the pipes 408. Optionally, the slots or openings 411 can include nozzles. Also similar to FIG. 1, the slots or openings 411 are arranged to cause the liquid feed to impinge on the cones 409, in order to facilitate even distribution of liquid within annular volume 403. Optionally but preferably, the nozzles 411 can be oriented so that the liquid exiting from slots or openings 411 has a lateral velocity component. In some aspects, pipes 408 and liquid conduits 410 can have a similar relationship to inner annular volume 403 as the relationships between catalyst inlet flow 104, inlet pipes 102, and solids volume 108. In such aspects, liquid conduits 410 can be in fluid communication with annular volume 403 via the plurality of slots or openings 411, in a manner similar to how inlet pipes 102 are in fluid communication with solids volume 108 via slots or openings 106.

During operation, gas from outer annular volume 402 passes radially into inner annular volume 403. This allows contact between gas, liquid, and solid for performing a desired reaction. The gas then continues radially into the first or outer central pipe 404. Outer central pipe 404 includes a plurality of bubble caps 412 or other structures that can allow gas to pass through into inner central pipe 405 while retaining liquid entrained with the gas in outer central pipe 404.

At the bottom of reactor 401, the gas, liquid, and solids can be separated to allow for further processing and/or or for introduction into a subsequent moving bed stage. The gas exits through a main gas exit line 416 that is in fluid communication with the bottom of inner central pipe 405. The solids can exit from inner annular volume 403 into a plurality of solids exit volumes, such as cone-shaped exit volumes 414 as shown in FIG. 4. A stripping gas 415 is passed through the solids exit volumes 414 to strip liquid from the solids prior to allowing the solids to exit via solids exit line 418. It is noted that a baffle 419 connects the cones 414, so that the stripping gas cannot bypass the cones. The stripping gas causes liquid in the solid particles to exit into the bottom of first or outer central pipe 404, where it is combined with any liquid collected by the bubble caps 412. The liquid can accumulate at the bottom of outer pipe 404 to a sufficient height so that the liquid can exit through openings 413 into liquid exit line 417.

Figure 5:
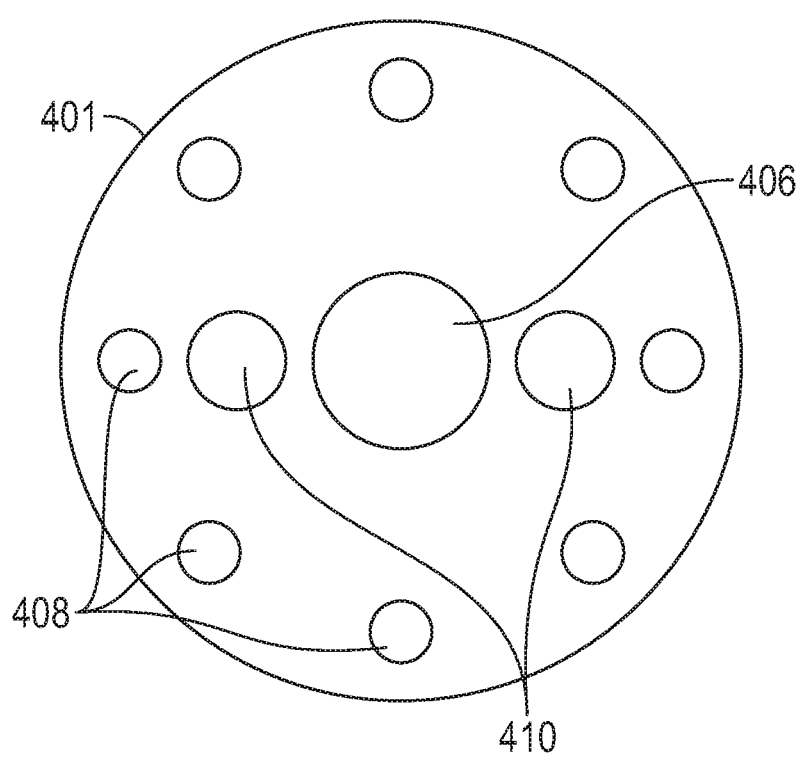
FIG. 5 shows a top view of the moving bed reactor shown in FIG. 4.

FIG. 5 shows a top view of the reactor 401 shown in FIG. 4. In FIG. 5, the input conduits corresponding to central opening 406, pipes 408 (for transfer of solid particles), and liquid conduits 410 are shown in relation to each other. It is noted that liquid conduits 410 are used within the reactor to provide liquid to a plurality of nozzles 411 (not visible in FIG. 5) that are arranged around each pipe 408.

It is noted that the configuration shown in FIG. 5 includes a total of 8 solids inlet conduits 408 and two liquid conduits 410. More generally, any convenient number of solids inlet conduits 408 and liquid conduits 410 can be used, so long as liquid is distributed around each solids inlet conduit. For example, in the configuration shown in FIG. 5, a distributor plate can be used to distribute the liquid feed from liquid conduits 410 around each of the solids inlet conduits 408. This can be performed by a single distributor plate that includes all of the liquid conduits 410 and solids inlet conduits 408. Alternatively, a part of distributor plates could be used, with each distributor plate receiving liquid from one liquid conduit 410 and distributing liquid to a portion of the solids inlet conduits 408. It is further noted that the annular solids volume could be segmented using one or more internal walls. This could allow a first group of solids inlet conduits 408 to provide catalyst particles to a first portion of the annular solids volume, while a second group of solids inlet conduits provides catalyst particles to a second portion of the annular solids volume. More generally, any convenient number of portions could be defined in the annular solids volume.

Example of Reaction Conditions—Conversion of Oxygenates and/or Olefins to Naphtha and Distillate An example of the type of reaction that can be performed using the feed distribution apparatus, feed separation method, moving bed reactors, and moving bed reactor configurations described herein is conversion of oxygenates to olefins, optionally with further oligomerization of the olefins to naphtha and/or distillate boiling range products. Examples of suitable oxygenates include feeds containing methanol, dimethyl ether, $C_1$-$C_4$ alcohols, ethers with $C_1$-$C_4$ alkyl chains, including both asymmetric ethers containing $C_1$-$C_4$ alkyl chains (such as methyl ethyl ether, propyl butyl ether, or methyl propyl ether) and symmetric ethers (such as diethyl ether, dipropyl ether, or dibutyl ether), or combinations thereof. It is noted that oxygenates containing at least one $C_1$-$C_4$ alkyl group are intended to explicitly identify oxygenates having alkyl groups containing 4 carbons or less. Preferably the oxygenate feed can include at least 30 wt % of one or more suitable oxygenates, or at least 50 wt %, or at least 75 wt %, or at least 90 wt %, or at least 95 wt %. Additionally or alternately, the oxygenate feed can include at least 50 wt % methanol, such as at least 75 wt % methanol, or at least 90 wt % methanol, or at least 95 wt % methanol. In particular, the oxygenate feed can include 30 wt % to 100 wt % of oxygenate (or methanol), or 50 wt % to 95 wt %, or 75 wt % to 100 wt %, or 75 wt % to 95 wt %. The oxygenate feed can be derived from any convenient source. For example, the oxygenate feed can be formed by reforming of hydrocarbons in a natural gas feed to form synthesis gas ($H_2$, CO, $CO_2$), and then using the synthesis gas to form methanol (or other alcohols). As another example, a suitable oxygenate feed can include methanol, dimethyl ether, or a combination thereof as the oxygenate.

In addition to oxygenates, in some aspects the feed can also include olefins. In this discussion, the olefins included as part of the feed can correspond to aliphatic olefins that contain 6 carbons or less, so that the olefins are suitable for formation of naphtha boiling range compounds. The olefin portion of the feed can be mixed with the oxygenates prior to entering a reactor for performing oxygenate conversion, or a plurality of streams containing oxygenates and/or olefins can be mixed within a conversion reactor. The feed can include 5 wt % to 40 wt % of olefins (i.e., olefins containing 6 carbons or less), or 5 wt % to 30 wt %, or 10 wt % to 40 wt %, or 10 wt % to 30 wt %. When the conversion is operated under low hydrogen transfer conditions with a catalyst that is selective for formation of paraffins and olefins, the addition of olefins can allow for further production of paraffins and olefins. In aspects where olefins are included in the feed, the molar ratio of oxygenates to olefins can be 20 or less, or 10 or less, or 6.0 or less, or 4.0 or less, such as down to a molar ratio of 1.0. For example, the molar ratio of oxygenates to olefins can be between 1.0 and 20, or between 1.0 and 10, or between 1.0 and 6.0, or between 4.0 and 20, or between 6.0 and 20. It is noted that the weight percent of olefins in the feed can be dependent on the nature of the olefins. For example, if a $C_5$ olefin is used as the olefin with a methanol-containing feed, the wt % of olefin required to achieve a desired molar ratio of olefin to oxygenate will be relatively high due to the much larger molecular weight of a $C_5$ alkene.

In some aspects, the olefins can correspond to olefins generated during the oxygenate conversion process. In such aspects, a portion of the effluent from the conversion process can be recycled to provide olefins for the feed. In other aspects, the olefins can be derived from any other convenient source. The olefin feed can optionally include compounds that act as inerts or act as a diluent in the conversion process. For example, a stream of "waste" olefins having an olefin content of 5 vol % to 20 vol % can be suitable as a source of olefins, so long as the other components of the "waste" olefins stream are compatible with the conversion process. For example, the other components of the olefin stream can correspond to inert gases such as $N_2$, carbon oxides, paraffins, and/or other gases that have low reactivity under the conversion conditions. Water can also be present, although it can be preferable for water to correspond to 20 vol % or less of the total feed, or 10 vol % or less.

In addition to oxygenates and olefins, a feed can also include diluents, such as water (in the form of steam), nitrogen or other inert gases, and/or paraffins or other non-reactive hydrocarbons. In some aspects, the source of olefins can correspond to a low purity source of olefins, so that the source of olefins corresponds to 20 wt % or less of olefins. In some aspects, the portion of the feed corresponding to components different from oxygenates and olefins can correspond to 1 wt % to 60 wt % of the feed, or 1 wt % to 25 wt %, or 10 wt % to 30 wt %, or 20 wt % to 60 wt %. Optionally, the feed can substantially correspond to oxygenates and olefins, so that the content of components different from oxygenates and olefins is 1 wt % or less (such as down to 0 wt %).

It is noted that the above feed description can correspond to the input stream for a group of moving bed reactors that are operated in series. In such aspects, the above feed can be passed into a first moving bed reactor, which partially converts oxygenates and/or partially oligomerizes olefins. The effluent from the first moving bed reactor can then be separated into solid particles, gas phase unreacted feed and intermediate products, and liquid products (if any) that have formed. The solid particles, liquid, and gas can then be introduced into a second moving bed reactor for further reaction. This can be repeated until a sufficient number of moving bed reactor stages have been used to achieve desired products. This can correspond to, for example, a sufficient number of stages to achieve complete oxygenate conversion, a sufficient number of stages so that oligomerization results in a desired weight percentage (relative to the feed) of distillate boiling range products, or another convenient reaction end point.

In aspects where a single series of reactors is used to upgrade oxygenates to distillate products, the net yield of $C_{5+}$ hydrocarbons in the upgrading effluent can be 10 wt % to 90 wt %, or 20 wt % to 80 wt %, or 40 wt % to 90 wt %, or 40 wt % to 80 wt % on a dry basis. The upgrading effluent can correspond to the effluent from the final moving bed stage of a series of moving bed reactors. The net yield refers to the yield of $C_{5+}$ hydrocarbons in the upgrading effluent minus the amount (if any) of $C_{5+}$ alkenes in the feed. For example, when pentene is used as an olefin in the feed, the weight of pentene in the feed is subtracted from the weight of $C_{5+}$ hydrocarbons in the upgrading effluent when determining net yield. It is noted that the net yield is expressed on a dry basis due to the high variability in the amount of water that may be produced, depending on the oxygenate used as the feed. For example, if a pre-conversion stage is used to convert methanol to water so that dimethyl ether is used as a feed introduced into the moving bed reactors, the weight of water in the conversion effluent can be reduced by roughly 50 wt %. In various aspects, the yield of paraffins plus olefins relative to the $C_{5+}$ portion of the hydrocarbon product can be 20 wt % to 90 wt %, or 40 wt % to 90 wt %, or 40 wt % to 80 wt %. Additionally or alternately, the yield of distillate compounds (330° F.+, ~165° C.+) relative to the $C_{5+}$ portion of the hydrocarbon product can be 20 wt % to 60 wt %, or 30 wt % to 60 wt %, or 30 wt % to 50 wt %. Further additionally or alternately, less than 10 wt % of the total hydrocarbon product can correspond to $C_1$ paraffins (methane).

In other aspects where separate series of reactors are used for oxygenate conversion and oligomerization, the net yield of $C_{5+}$ hydrocarbons in the conversion effluent can be 10 wt % to 30 wt % on a dry basis. The conversion effluent can correspond to the effluent from the final moving bed stage of a first series of moving bed reactors. In such aspects, the yield of paraffins plus olefins relative to the $C_{5+}$ portion of the hydrocarbon product in the conversion effluent (on a dry basis) can be 20 wt % to 90 wt %, or 40 wt % to 90 wt %, or 40 wt % to 80 wt %. Additionally or alternately, the yield of olefins relative to the total hydrocarbon product in the conversion effluent (on a dry basis) can be 20 wt % to 80 wt %, or 40 wt % to 80 wt %, or 40 wt % to 70 wt %. Further additionally or alternately, less than 10 wt % of the total hydrocarbon product in the conversion effluent can correspond to $C_1$ paraffins (methane).

At least a portion of the conversion effluent can then be passed into the second series of reactors for oligomerization. The oligomerization effluent can include a naphtha boiling range portion, a distillate fuel boiling range portion, and a light ends portion. Optionally but preferably, the oligomerization effluent can include 20 wt % or more of compounds boiling above the naphtha boiling range (204° C.+), or 30 wt % or more, on a dry basis.

Suitable and/or effective conditions for performing an oxygenate conversion reaction and/or combined conversion plus oligomerization (i.e. upgrading) can include average reaction temperatures of 230° C. to 450° C., 230° C. to 290° C., or 250° C. to 300° C., or 230° C. to 280° C., or 270° C. to 300° C.; total pressures between 1 psig (~7 kPag) to 400 psig (~2700 kPag), or 10 psig (~70 kPag) to 150 psig (~1050 kPag), or 10 psig (~70 kPag) to 100 psig (~700 kPag), and an oxygenate space velocity between 0.1 $hr^{-1}$ to 10 $hr^{-1}$ based on weight of oxygenate relative to weight of catalyst (WHSV), or 0.1 $hr^{-1}$ to 5.0 $hr^{-1}$, or 1.0 $hr^{-1}$ to 5.0 $hr^{-1}$. In this discussion, average reaction temperature is defined as the average of the temperature at the reactor inlet and the temperature at the reactor outlet for the reactor where the conversion reaction is performed. In some aspects, the reaction conditions between reactors within a series of reactors can be substantially the same. In some aspects, the reaction conditions can vary between reactors within a series of reactors, depending on the reaction taking place in each moving bed reactor. For example, in a series of reactors containing four moving beds, the first three moving bed reactors can operate at higher temperature to facilitate oxygenate conversion. The final moving bed reactor can operate at a lower temperature to facilitate performing additional oligomerization on the olefins produced in the first three moving bed reactors.

In aspects where a separate series of moving bed reactors is used for oligomerization, suitable and/or effective conditions for performing an oligomerization reaction can include average reaction temperatures of 180° C. to 250° C., or 200° C. to 250° C.; total pressures between 50 psig (~340 kPag) to 800 psig (~5,500 kPag), and an oxygenate space velocity between 0.1 hr$^{-1}$ to 10 hr$^{-1}$ based on weight of oxygenate relative to weight of catalyst (WHSV), or 0.1 hr$^{-1}$ to 5.0 hr$^{-1}$, or 1.0 hr$^{-1}$ to 5.0 hr$^{-1}$.

In various aspects, a transition metal-enhanced zeolite catalyst composition can be used for conversion of oxygenate feeds to naphtha boiling range fractions and olefins. In this discussion and the claims below, a zeolite is defined to refer to a crystalline material having a porous framework structure built from tetrahedra atoms connected by bridging oxygen atoms. Examples of known zeolite frameworks are given in the "Atlas of Zeolite Frameworks" published on behalf of the Structure Commission of the International Zeolite Association", 6$^{th}$ revised edition, Ch. Baerlocher, L. B. McCusker, D. H. Olson, eds., Elsevier, New York (2007) and the corresponding web site, http://www.iza-structure.org/databases/. Under this definition, a zeolite can refer to aluminosilicates having a zeolitic framework type as well as crystalline structures containing oxides of heteroatoms different from silicon and aluminum. Such heteroatoms can include any heteroatom generally known to be suitable for inclusion in a zeolitic framework, such as gallium, boron, germanium, phosphorus, zinc, and/or other transition metals that can substitute for silicon and/or aluminum in a zeolitic framework.

A suitable zeolite can include a 1-dimensional or 2-dimensional 10-member ring pore channel network. In some aspects, additional benefits can be achieved if the zeolite also has 12-member ring pockets at the surface, such as MWW framework (e.g., MCM-49, MCM-22). Such pockets represent active sites having a 12-member ring shape, but do not provide access to a pore network. Examples of MWW framework zeolites include MCM-22, MCM-36, MCM-49, MCM-56, EMM-10, EMM-12, EMM-13, and ITQ-2. In some aspects, zeolites with a 1-dimensional or 2-dimensional 12-member ring pore channel network can also be suitable, such as MOR framework zeolites. Examples of suitable zeolites having a 1-dimensional 10-member ring pore channel network include zeolites having a MRE (e.g, ZSM-48), MTW, TON (e.g., ZSM-22), MTT (e.g., ZSM-23), and/or MFS framework. In some aspects, ZSM-48, ZSM-22, MCM-22, MCM-49, or a combination thereof can correspond to preferred zeolites.

Generally, a zeolite having desired activity for methanol conversion can have a silicon to aluminum molar ratio of 5 to 200, or 15 to 100, or 20 to 80, or 20 to 40. For example, the silicon to aluminum ratio can be at least 10, or at least 20, or at least 30, or at least 40, or at least 50, or at least 60. Additionally or alternatively, the silicon to aluminum ratio can be 300 or less, or 200 or less, or 100 or less, or 80 or less, or 60 or less, or 50 or less.

It is noted that the molar ratio described herein is a ratio of silicon to aluminum. If a corresponding ratio of silica to alumina were described, the corresponding ratio of silica ($SiO_2$) to alumina ($Al_2O_3$) would be twice as large, due to the presence of two aluminum atoms in each alumina stoichiometric unit. Thus, a silicon to aluminum ratio of 10 corresponds to a silica to alumina ratio of 20.

In some aspects, a zeolite in a catalyst can be present at least partly in the hydrogen form. Depending on the conditions used to synthesize the zeolite, this may correspond to converting the zeolite from, for example, the sodium form. This can readily be achieved, for example, by ion exchange to convert the zeolite to the ammonium form followed by calcination in air or an inert atmosphere at a temperature of 400° C. to 700° C. to convert the ammonium form to the active hydrogen form.

Additionally or alternatively, a zeolitic catalyst can include and/or be enhanced by a transition metal. The transition metal can be any convenient transition metal selected from Groups 6-15 of the IUPAC periodic table. The transition metal can be incorporated into the zeolite/catalyst by any convenient method, such as by impregnation, by ion exchange, by mulling prior to extrusion, and/or by any other convenient method. Optionally, the transition metal incorporated into a zeolite/catalyst can correspond to two or more metals. After impregnation or ion exchange, the transition metal-enhanced catalyst can be treated in air or an inert atmosphere at a temperature of 400° C. to 700° C. The amount of transition metal can be expressed as a weight percentage of metal relative to the total weight of the catalyst (including any zeolite and any binder). A catalyst can include 0.05 wt % to 20 wt % of one or more transition metals, or 0.1 wt % to 10 wt %, or 0.1 wt % to 5 wt %, or 0.1 wt % to 2.0 wt %. For example, the amount of transition metal can be at least 0.1 wt % of transition metal, or at least 0.25 wt % of transition metal, or at least 0.5 wt %, or at least 0.75 wt %, or at least 1.0 wt %. Additionally or alternatively, the amount of transition metal can be 20 wt % or less, or 10 wt % or less, or 5 wt % or less, or 2.0 wt % or less, or 1.5 wt % or less, or 1.2 wt % or less, or 1.1 wt % or less, or 1.0 wt % or less.

A catalyst composition can employ a zeolite in its original crystalline form or after formulation into catalyst particles, such as by extrusion. A process for producing zeolite extrudates in the absence of a binder is disclosed in, for example, U.S. Pat. No. 4,582,815, the entire contents of which are incorporated herein by reference. Preferably, the transition metal can be incorporated after formulation of the zeolite (such as by extrusion) to form catalyst particles without an added binder. Optionally, such an "unbound" catalyst can be steamed after extrusion. The terms "unbound" is intended to mean that the present catalyst composition is free of any of the inorganic oxide binders, such as alumina or silica, frequently combined with zeolite catalysts to enhance their physical properties.

The catalyst compositions described herein can further be characterized based on activity for hexane cracking, or Alpha value. Alpha value is a measure of the acid activity of a zeolite catalyst as compared with a standard silica-alumina catalyst. The alpha test is described in U.S. Pat. No. 3,354,078; in the Journal of Catalysis, Vol. 4, p. 527 (1965); Vol. 6, p. 278 (1966); and Vol. 61, p. 395 (1980), each incorporated herein by reference as to that description. The experimental conditions of the test used herein include a constant temperature of 538° C. and a variable flow rate as described in detail in the Journal of Catalysis, Vol. 61, p. 395. Higher alpha values correspond with a more active cracking catalyst. For an oxygenate conversion catalyst, Alpha value can be 15 to 150, or 15 to 100, or 15 to 50. Lower Alpha values can be beneficial, as increased acidity can tend to increase hydrogen transfer. In other aspects, such as when the conversion is performed at temperatures of 275° C. or less, or 250° C. or less, catalysts with an Alpha value of 15 to 1000 can be suitable. This is due to the suppression of hydrogen transfer at lower temperatures.

As an alternative to forming catalysts without a separate binder, zeolite crystals can be combined with a binder to form bound catalysts. Suitable binders for zeolite-based catalysts can include various inorganic oxides, such as silica, alumina, zirconia, titania, silica-alumina, cerium oxide, magnesium oxide, yttrium oxide, or combinations thereof. For catalysts including a binder, the catalyst can comprise at least 10 wt % zeolite, or at least 30 wt %, or at least 50 wt %, such as up to 90 wt % or more. Generally, a binder can be present in an amount between 1 wt % and 90 wt %, for example between 5 wt % and 40 wt % of a catalyst composition. In some aspects, the catalyst can include at least 5 wt % binder, such as at least 10 wt %, or at least 20 wt %. Additionally or alternately, the catalyst can include 90 wt % or less of binder, such as 50 wt % or less, or 40 wt % or less, or 35 wt % or less. Combining the zeolite and the binder can generally be achieved, for example, by mulling an aqueous mixture of the zeolite and binder and then extruding the mixture into catalyst pellets. A process for producing zeolite extrudates using a silica binder is disclosed in, for example, U.S. Pat. No. 4,582,815. Optionally, a bound catalyst can be steamed after extrusion.

ADDITIONAL EMBODIMENTS

Embodiment 1

A method for upgrading a feed to form distillate boiling range compounds, comprising: passing a catalyst flow comprising a catalyst into a first moving bed reactor of a plurality of serially connected moving bed reactors, the first moving bed reactor comprising a first reactor feed inlet and a first reactor effluent outlet, the catalyst comprising at least one of oxygenate conversion catalyst and olefin oligomerization catalyst; exposing a feed to the catalyst flow in the first moving bed reactor under first reaction conditions comprising at least one of oxygenate conversion conditions and oligomerization conditions, to form a first partially reacted effluent, a temperature differential between the first reactor feed inlet and the first reactor effluent outlet being 85° C. or less; stripping the catalyst flow with a first stripping fluid to separate at least a portion of the first partially reacted effluent from the catalyst flow, the at least a portion of the first partially reacted effluent optionally exiting the first moving bed reactor through the first reactor effluent outlet, the at least a portion of the first partially reacted effluent comprising a liquid phase effluent portion and a vapor phase effluent portion; passing the stripped catalyst flow into a second moving bed reactor of the plurality of serially connected moving bed reactors; passing the liquid phase effluent portion into the second moving bed reactor as a substantially axial flow; and exposing the vapor phase effluent portion to the stripped catalyst flow in the presence of the liquid effluent portion in the second moving bed reactor under second reaction conditions comprising at least one of oxygenate conversion conditions and oligomerization conditions, to form a second effluent comprising distillate boiling range compounds.

Embodiment 2

The method of Embodiment 1, wherein the feed comprises at least a portion of an effluent from a third moving bed reactor of the plurality of serially connected moving bed reactors.

Embodiment 3

The method of any of the above embodiments, wherein the catalyst comprises olefin oligomerization catalyst and wherein the first reaction conditions comprise oligomerization conditions, the method further comprising: converting an oxygenate feedstock in one or more reactors to form a conversion effluent comprising a conversion total hydrocarbon product, the conversion total hydrocarbon product comprising 20 wt % or more olefins, wherein the feed comprises at least a portion of the conversion total hydrocarbon product.

Embodiment 4

The method of Embodiment 3, wherein converting the oxygenate feedstock comprises: passing a second catalyst flow comprising oxygenate conversion catalyst into a fourth moving bed reactor of a second plurality of serially connected moving bed reactors, the fourth moving bed reactor comprising a fourth reactor feed inlet and a fourth reactor effluent outlet; exposing the oxygenate feedstock to the second catalyst flow in the fourth moving bed reactor under oxygenate upgrading conditions to form a partially converted effluent, a temperature differential between the fourth reactor feed inlet and the fourth reactor effluent outlet being 80° C. or less; stripping the second catalyst flow with a second stripping fluid to separate at least a portion of the partially converted effluent from the second catalyst flow, the at least a portion of the partially converted effluent optionally exiting the fourth moving bed reactor through the fourth reactor effluent outlet, the at least a portion of the partially converted effluent comprising a vapor phase converted effluent portion; passing the second stripped catalyst flow into a fifth moving bed reactor of the second plurality of serially connected moving bed reactors; and exposing the vapor phase converted effluent portion to the second stripped catalyst flow in the fifth moving bed reactor under second oxygenate upgrading conditions to form the conversion effluent.

Embodiment 5

The method of Embodiment 4, wherein the at least a portion of the partially converted effluent further comprises a liquid phase converted effluent portion, the method further comprising: passing the liquid phase converted effluent portion into the fifth moving bed reactor as a substantially axial flow, wherein the vapor phase converted effluent portion is exposed to the second stripped catalyst flow in the fifth moving bed reactor in the presence of the liquid converted effluent portion.

Embodiment 6

The method of Embodiment 4 or 5, wherein the olefin oligomerization catalyst and the oxygenate conversion catalyst are regenerated in a common regenerator, or wherein a rate of the catalyst flow into the first moving bed reactor is different from a rate of the catalyst flow into the fourth moving bed reactor, or a combination thereof.

Embodiment 7

The method of any of the above embodiments, further comprising: separating spent catalyst from the second effluent; and passing the spent catalyst into a regenerator to form regenerated catalyst, wherein at least a portion of the catalyst flow comprises regenerated catalyst.

Embodiment 8

The method of any of the above embodiments, wherein the stripped catalyst flow into the second moving bed reactor forms a catalyst bed having a top surface comprising one or more cones at an angle of repose of the catalyst in the stripped catalyst flow, and wherein passing the liquid phase effluent portion into the second moving bed reactor comprises contacting at least a portion of the liquid phase effluent portion with the one or more cones.

Embodiment 9

The method of any of the above embodiments, wherein the vapor flow within the second moving bed reactor comprises an axial vapor flow, or wherein the vapor flow within the second moving bed reactor comprises a radial vapor flow.

Embodiment 10

The method of any of the above embodiments, wherein the oxygenate catalyst comprises a zeotype catalyst, or wherein oligomerization catalyst comprises a zeotype catalyst, or a combination thereof, the zeotype catalyst optionally comprising ZSM-48.

Embodiment 11

A system for upgrading oxygenates, comprising: a first plurality of serially connected moving bed reactors, each moving bed reactor in the first plurality of serially connected moving bed reactors comprising a catalyst inlet, a feed inlet, a stripping fluid inlet, a catalyst outlet, and a vapor phase effluent outlet; a separation stage comprising a separation stage inlet and one or more separation stage outlets, the separation stage inlet being in fluid communication with at least at least one vapor phase effluent outlet; a second plurality of serially connected second moving bed reactors, each moving bed reactor in the second plurality of serially connected moving bed reactors comprising a second catalyst inlet, a second feed inlet, a second stripping fluid inlet, a second catalyst outlet, a second liquid phase effluent outlet, and a second vapor phase effluent outlet, at least one second feed inlet being in fluid communication with at least one of the one or more separation stage outlets; a second separation stage comprising a second separation stage inlet and one or more second separation stage outlets, the separation stage inlet being in fluid communication with at least one second liquid phase effluent outlet and at least one second vapor phase effluent outlet; and a regenerator comprising a first regenerator inlet, a first regenerator outlet, a second regenerator inlet, a second regenerator outlet, an oxygen inlet, and a flue gas outlet, the first regenerator inlet being in solids flow communication with at least one catalyst outlet, the second regenerator inlet being in solids flow communication with at least one second catalyst outlet, the first regenerator outlet being in solids flow communication with at least one catalyst inlet, the second regenerator outlet being in solids flow communication with at least one second catalyst inlet.

Embodiment 12

The system of Embodiment 11, wherein each moving bed reactor in the first plurality of serially connected moving bed reactors further comprises a liquid phase effluent outlet, the separation stage being in fluid communication with at least one liquid phase effluent outlet, and wherein the second feed inlet comprises a gas feed inlet and a liquid feed inlet.

Embodiment 13

The system of Embodiment 11 or 12, a) wherein one or more moving bed reactors of the first plurality of serially connected moving bed reactors further comprise first solids volumes, the first solids volumes comprising moving beds of oxygenate conversion catalyst having top surfaces comprising a cone at an angle of repose of the oxygenate conversion catalyst; b) wherein one or more moving bed reactors of the second plurality of serially connected moving bed reactors further comprise second solids volumes, the second solids volumes comprising moving beds of olefin oligomerization catalyst having top surfaces comprising a cone at an angle of repose of the olefin oligomerization catalyst; or c) a combination of a) and b).

Embodiment 14

The system of any of Embodiments 11-13, wherein the second plurality of serially connected moving bed reactors comprises a vertical stack, at least one second catalyst outlet being in solids flow communication with at least one second catalyst inlet without passing through a catalyst flow controller.

Embodiment 15

An effluent comprising distillate boiling range compounds made according to the method of any of Embodiments 1-10 or made using the system of any of Embodiments 11-14.

Additional Embodiment A

The method of any of the above Embodiments 1-10, wherein the at least a portion of the first partially reacted effluent comprises 95 mol % or more of the hydrocarbonaceous compounds in the first partially reacted effluent.

Additional Embodiment B

The method of any of Embodiments 1-10, wherein the plurality of serially connected moving bed reactors comprises a vertical stack, and wherein the stripped catalyst flow is passed into the second reactor without passing through a catalyst flow controller.

Additional Embodiment C

The system of any of Embodiments 11-14, wherein the one or more moving bed reactors of the second plurality of serially connected moving bed reactors comprise one or more of the following elements, or two or more of the following elements, or a plurality of the following elements, or up to substantially all of the following elements: a reactor comprising an annular outer volume, an annular solids volume inside the annular outer volume, a first central conduit inside of the annular solids volume, and an inner central conduit inside the first central conduit, the annular solids volume comprising a plurality of perforations providing vapor communication between the annular outer volume and the first central conduit, the perforations preventing flow of solid particles into the annular outer volume and into the first central conduit; a central gas opening in fluid communication with the outer annular volume; a plurality of solids inlet conduits in solids flow communication with the annular solids volume; one or more distributor plates comprising distributor plate concave volumes, a plurality of the distributor plate concave volumes being arranged around each of the solids inlet conduits, each distributor plate concave volume comprising one or more orifices providing fluid communication between each distributor plate concave volume and the annular solids volume; a plurality of liquid inlet conduits in fluid communication with the distributor plate concave volumes; a gas exit conduit in fluid communication with the inner central volume; a liquid exit conduit in fluid communication with the outer central volume; and a solids exit volume in solids flow communication with a bottom of the solids annular volume, the solids exit volume further comprising a stripping gas inlet and a stripping gas outlet, the stripping gas outlet providing fluid communication with the outer central volume.

Additional Embodiment D

The system of any of Embodiments 11-14 or Additional Embodiment C, wherein the one or more moving bed reactors of the second plurality of serially connected moving bed reactors comprise one or more of the following elements, or two or more of the following elements, or all of the following elements: one or more solids inlet conduits in solids flow communication with a solids volume in a moving bed reactor, the one or more solids inlet conduits having a smaller characteristic width than a width of the solids volume at an interface between each solids inlet conduit and the solids volume; a distributor plate comprising a plurality of concave volumes around each of the one or more solids inlet conduits, and a plurality of exit surfaces separating the plurality of concave volumes from the solids volume within the moving bed reactor, each concave volume comprising one or more orifices providing fluid communication, through an exit surface, between the concave volume and the solids volume; and a plurality of fluid inlet conduits in fluid communication with the plurality of concave volumes, wherein the plurality of exit surfaces are oriented at an angle of 15° to 45° relative to a plane defined by at least one interface between the one or more solids inlet conduits and the solids volume.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A method for upgrading a feed to form distillate boiling range compounds, comprising:
    passing a catalyst flow comprising a catalyst into a first moving bed reactor of a first plurality of serially connected moving bed reactors, the first moving bed reactor comprising a first reactor feed inlet, a first reactor effluent outlet, a stripping fluid inlet, a catalyst outlet, and a vapor phase effluent outlet, the catalyst comprising at least one of oxygenate conversion catalyst and olefin oligomerization catalyst;
    exposing a feed to the catalyst flow in the first moving bed reactor under first reaction conditions comprising at least one of oxygenate conversion conditions and oligomerization conditions, to form a first partially reacted effluent, a temperature differential between the first reactor feed inlet and the first reactor effluent outlet being 85° C. or less;
    stripping the catalyst flow with a first stripping fluid to separate at least a portion of the first partially reacted effluent from the catalyst flow, the at least a portion of the first partially reacted effluent comprising a liquid phase effluent portion and a vapor phase effluent portion;
    separating the liquid phase effluent from the vapor phase effluent in a separation stage comprising a separation stage inlet and one or more separation stage outlets;
    passing the stripped catalyst flow into a second moving bed reactor of a second plurality of serially connected moving bed reactors, each moving bed reactor in the second plurality of serially connected moving bed reactors comprising a second catalyst inlet, a second feed inlet, a second stripping fluid inlet, a second catalyst outlet, a second liquid phase effluent outlet different from the second catalyst outlet, and a second vapor phase effluent outlet different from the second catalyst outlet and different from the second liquid phase effluent outlet;
    passing the liquid phase effluent portion into the second moving bed reactor as a substantially axial flow;
    exposing the vapor phase effluent portion to the stripped catalyst flow in the presence of the liquid effluent portion in the second moving bed reactor under second reaction conditions comprising at least one of oxygenate conversion conditions and oligomerization conditions, to form a second liquid phase effluent, a second vapor phase effluent, and a second stripped catalyst flow, at least one of the second liquid phase effluent and the second vapor phase effluent comprising distillate boiling range compounds;
    separating at least a portion of the distillate boiling range compounds from the second liquid phase effluent and the second vapor phase effluent in a second separation stage comprising a second separation stage inlet and one or more second separation stage outlets; and
    regenerating at least a portion of the stripped catalyst flow and at least a portion of the second stripped catalyst flow in a regenerator comprising a first regenerator inlet, a first regenerator outlet, a second regenerator inlet, a second regenerator outlet, an oxygen inlet, and a flue gas outlet.

2. The method of claim 1, wherein the feed comprises at least a portion of an effluent from a third moving bed reactor of the first plurality of serially connected moving bed reactors.

3. The method of claim 1, wherein the at least a portion of the first partially reacted effluent exits the first moving bed reactor through the first reactor effluent outlet.

4. The method of claim 1, wherein the stripped catalyst flow into the second moving bed reactor forms a catalyst bed having a top surface comprising one or more cones at an angle of repose of the catalyst in the stripped catalyst flow, and wherein passing the liquid phase effluent portion into the second moving bed reactor comprises contacting at least a portion of the liquid phase effluent portion with the one or more cones.

5. The method of claim 1, wherein the vapor flow within the second moving bed reactor comprises an axial vapor flow, or wherein the vapor flow within the second moving bed reactor comprises a radial vapor flow.

6. The method of claim 1, wherein the catalyst comprises a zeotype catalyst.

7. The method of claim 6, wherein the zeotype catalyst comprises ZSM-48.

8. The method of claim 1, wherein the plurality of serially connected moving bed reactors comprises a vertical stack, and wherein the stripped catalyst flow is passed into the second reactor without passing through a catalyst flow controller.

9. A system for upgrading oxygenates, comprising:
a first plurality of serially connected moving bed reactors, each moving bed reactor in the first plurality of serially connected moving bed reactors comprising a catalyst inlet, a feed inlet, a stripping fluid inlet, a catalyst outlet, and a vapor phase effluent outlet;
a separation stage comprising a separation stage inlet and one or more separation stage outlets, the separation stage inlet being in fluid communication with at least one vapor phase effluent outlet;
a second plurality of serially connected moving bed reactors, each moving bed reactor in the second plurality of serially connected moving bed reactors comprising a second catalyst inlet, a second feed inlet, a second stripping fluid inlet, a second catalyst outlet, a second liquid phase effluent outlet different from the second catalyst outlet, and a second vapor phase effluent outlet different from the second catalyst outlet and different from the second liquid phase effluent outlet, at least one second feed inlet being in fluid communication with at least one of the one or more separation stage outlets;
a second separation stage comprising a second separation stage inlet and one or more second separation stage outlets, the separation stage inlet being in fluid communication with at least one second liquid phase effluent outlet and at least one second vapor phase effluent outlet; and
a regenerator comprising a first regenerator inlet, a first regenerator outlet, a second regenerator inlet, a second regenerator outlet, an oxygen inlet, and a flue gas outlet, the first regenerator inlet being in solids flow communication with at least one catalyst outlet, the second regenerator inlet being in solids flow communication with at least one second catalyst outlet, the first regenerator outlet being in solids flow communication with at least one catalyst inlet, the second regenerator outlet being in solids flow communication with at least one second catalyst inlet.

10. The system of claim 9, wherein each moving bed reactor in the first plurality of serially connected moving bed reactors further comprises a liquid phase effluent outlet, the separation stage being in fluid communication with at least one liquid phase effluent outlet.

11. The system of claim 9, wherein the second feed inlet comprises a gas feed inlet and a liquid feed inlet.

12. The system of claim 9, wherein one or more moving bed reactors of the first plurality of serially connected moving bed reactors further comprise first solids volumes, the first solids volumes comprising moving beds of oxygenate conversion catalyst having top surfaces comprising a cone at an angle of repose of the oxygenate conversion catalyst.

13. The system of claim 9, wherein one or more moving bed reactors of the second plurality of serially connected moving bed reactors further comprise second solids volumes, the second solids volumes comprising moving beds of oxygenate conversion catalyst having top surfaces comprising a cone at an angle of repose of the oxygenate conversion catalyst.

14. The system of claim 9, wherein the second plurality of serially connected moving bed reactors comprises a vertical stack, at least one second catalyst outlet being in solids flow communication with at least one second catalyst inlet without passing through a catalyst flow controller.

15. A system for upgrading oxygenates, comprising:
a first plurality of serially connected moving bed reactors, each moving bed reactor in the first plurality of serially connected moving bed reactors comprising a catalyst inlet, a feed inlet, a stripping fluid inlet, a catalyst outlet, and a vapor phase effluent outlet;
a separation stage comprising a separation stage inlet and one or more separation stage outlets, the separation stage inlet being in fluid communication with at least one vapor phase effluent outlet;
a second plurality of serially connected moving bed reactors, each moving bed reactor in the second plurality of serially connected moving bed reactors comprising a second catalyst inlet, a second feed inlet, a second stripping fluid inlet, a second catalyst outlet, a second liquid phase effluent outlet, and a second vapor phase effluent outlet, at least one second feed inlet being in fluid communication with at least one of the one or more separation stage outlets;
a second separation stage comprising a second separation stage inlet and one or more second separation stage outlets, the separation stage inlet being in fluid communication with at least one second liquid phase effluent outlet and at least one second vapor phase effluent outlet; and
a regenerator comprising a first regenerator inlet, a first regenerator outlet, a second regenerator inlet, a second regenerator outlet, an oxygen inlet, and a flue gas outlet, the first regenerator inlet being in solids flow communication with at least one catalyst outlet, the second regenerator inlet being in solids flow communication with at least one second catalyst outlet, the first regenerator outlet being in solids flow communication with at least one catalyst inlet, the second regenerator outlet being in solids flow communication with at least one second catalyst inlet,
wherein the one or more moving bed reactors of the second plurality of serially connected moving bed reactors comprise:
a reactor comprising an annular outer volume, an annular solids volume inside the annular outer volume, a first central conduit inside of the annular solids volume, and an inner central conduit inside the first central conduit, the annular solids volume comprising a plurality of perforations providing vapor communication between the annular outer volume and the first central conduit, the perforations preventing flow of solid particles into the annular outer volume and into the first central conduit;
a central gas opening in fluid communication with the outer annular volume;
a plurality of solids inlet conduits in solids flow communication with the annular solids volume;
one or more distributor plates comprising distributor plate concave volumes, a plurality of the distributor plate concave volumes being arranged around each of the solids inlet conduits, each distributor plate concave volume comprising one or more orifices providing fluid communication between each distributor plate concave volume and the annular solids volume;
a plurality of liquid inlet conduits in fluid communication with the distributor plate concave volumes;
a gas exit conduit in fluid communication with the inner central volume;

a liquid exit conduit in fluid communication with the outer central volume; and a solids exit volume in solids flow communication with a bottom of the solids annular volume, the solids exit volume further comprising a stripping gas inlet and a stripping gas outlet, the stripping gas outlet providing fluid communication with the outer central volume.

16. A system for upgrading oxygenates, comprising:

a first plurality of serially connected moving bed reactors, each moving bed reactor in the first plurality of serially connected moving bed reactors comprising a catalyst inlet, a feed inlet, a stripping fluid inlet, a catalyst outlet, and a vapor phase effluent outlet;

a separation stage comprising a separation stage inlet and one or more separation stage outlets, the separation stage inlet being in fluid communication with at least one vapor phase effluent outlet;

a second plurality of serially connected moving bed reactors, each moving bed reactor in the second plurality of serially connected moving bed reactors comprising a second catalyst inlet, a second feed inlet, a second stripping fluid inlet, a second catalyst outlet, a second liquid phase effluent outlet, and a second vapor phase effluent outlet, at least one second feed inlet being in fluid communication with at least one of the one or more separation stage outlets;

a second separation stage comprising a second separation stage inlet and one or more second separation stage outlets, the separation stage inlet being in fluid communication with at least one second liquid phase effluent outlet and at least one second vapor phase effluent outlet; and a regenerator comprising a first regenerator inlet, a first regenerator outlet, a second regenerator inlet, a second regenerator outlet, an oxygen inlet, and a flue gas outlet, the first regenerator inlet being in solids flow communication with at least one catalyst outlet, the second regenerator inlet being in solids flow communication with at least one second catalyst outlet, the first regenerator outlet being in solids flow communication with at least one catalyst inlet, the second regenerator outlet being in solids flow communication with at least one second catalyst inlet, wherein the one or more moving bed reactors of the second plurality of serially connected moving bed reactors comprise:

one or more solids inlet conduits in solids flow communication with a solids volume in a moving bed reactor, the one or more solids inlet conduits having a smaller characteristic width than a width of the solids volume at an interface between each solids inlet conduit and the solids volume;

a distributor plate comprising a plurality of concave volumes around each of the one or more solids inlet conduits, and a plurality of exit surfaces separating the plurality of concave volumes from the solids volume within the moving bed reactor, each concave volume comprising one or more orifices providing fluid communication, through an exit surface, between the concave volume and the solids volume; and a plurality of fluid inlet conduits in fluid communication with the plurality of concave volumes, wherein the plurality of exit surfaces are oriented at an angle of 15° to 45° relative to a plane defined by at least one interface between the one or more solids inlet conduits and the solids volume.

* * * * *